United States Patent
Lee et al.

(10) Patent No.: US 10,542,357 B2
(45) Date of Patent: Jan. 21, 2020

(54) EARSET, EARSET SYSTEM, AND EARSET CONTROL METHOD

(71) Applicant: LG ELECTRONICS INC., Seoul (KR)

(72) Inventors: Heungkyu Lee, Seoul (KR); Byounggi Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/752,722

(22) PCT Filed: Aug. 26, 2016

(86) PCT No.: PCT/KR2016/009569
§ 371 (c)(1),
(2) Date: Feb. 14, 2018

(87) PCT Pub. No.: WO2017/039255
PCT Pub. Date: Mar. 9, 2017

(65) Prior Publication Data
US 2018/0241863 A1  Aug. 23, 2018

(30) Foreign Application Priority Data
Aug. 31, 2015  (KR) ........................ 10-2015-0122866

(51) Int. Cl.
H04R 25/00 (2006.01)
H04M 1/60 (2006.01)
H04R 1/10 (2006.01)

(52) U.S. Cl.
CPC ........ *H04R 25/558* (2013.01); *H04M 1/6066* (2013.01); *H04R 25/50* (2013.01);
(Continued)

(58) Field of Classification Search
CPC ........ H04R 1/10; H04R 1/105; H04R 1/6066; H04R 25/43; H04R 25/50; H04R 25/505;
(Continued)

(56) References Cited

U.S. PATENT DOCUMENTS 7,813,698 B2 * 10/2010 Seshadri ................. H04M 1/05
　　　　　　　　　　　　　　　　　　379/114.01
8,688,174 B2 * 4/2014 Latham ............... H04M 1/0258
　　　　　　　　　　　　　　　　　　381/370
(Continued)

FOREIGN PATENT DOCUMENTS

KR　10-2004-0076457　9/2004
KR　10-2006-0065270　6/2006
(Continued)

OTHER PUBLICATIONS

International Search Report and Written Opinion dated Dec. 21, 2016 issued in Application No. PCT/KR2016/009569 (Full English Translation).

*Primary Examiner* — Jesse A Elbin
(74) *Attorney, Agent, or Firm* — KED & Associates, LLP

(57) ABSTRACT

The present invention relates to an ear-set, an ear-set system, and a method for controlling the same. An ear-set according to an embodiment of the present invention comprises: an ear-set body comprising a communication module, which can conduct short-range communication with an external audio source device, and which receives an audio signal from the audio source device, a memory unit, which stored user setting information, an audio adjustment unit, which adjusts the magnitude of an input audio signal on the basis of the stored user setting information, and an audio output unit, which outputs the adjusted audio signal; and an ear-set housing, which contains the ear-set body on one side thereof, and which provides the ear-set body with electric charging in the contained state.

15 Claims, 21 Drawing Sheets

(52) U.S. Cl.
CPC .............. *H04R 25/65* (2013.01); *H04R 1/105* (2013.01); *H04R 25/554* (2013.01)

(58) Field of Classification Search
CPC .. H04R 25/554; H04R 25/556; H04R 25/558; H04R 25/65
USPC .......................... 381/315, 322, 370, 384, 395
See application file for complete search history.

(56) References Cited

U.S. PATENT DOCUMENTS

| | | | |
|---|---|---|---|
| 8,693,714 B2 * | 4/2014 | Edgar .................. | H04R 25/558 381/314 |
| 2002/0068610 A1 * | 6/2002 | Anvekar ............. | H04M 1/6066 455/560 |
| 2008/0304688 A1 * | 12/2008 | Kumar ................. | G06F 1/1616 381/370 |
| 2010/0254552 A1 * | 10/2010 | Barthel ................. | H04R 25/70 381/314 |
| 2016/0183009 A1 * | 6/2016 | Kim ....................... | H04R 25/30 381/315 |

FOREIGN PATENT DOCUMENTS

| | | |
|---|---|---|
| KR | 10-2007-0000823 | 1/2007 |
| KR | 10-0708255 | 4/2007 |
| KR | 10-2014-0031422 | 3/2014 |

\* cited by examiner

FIG. 1
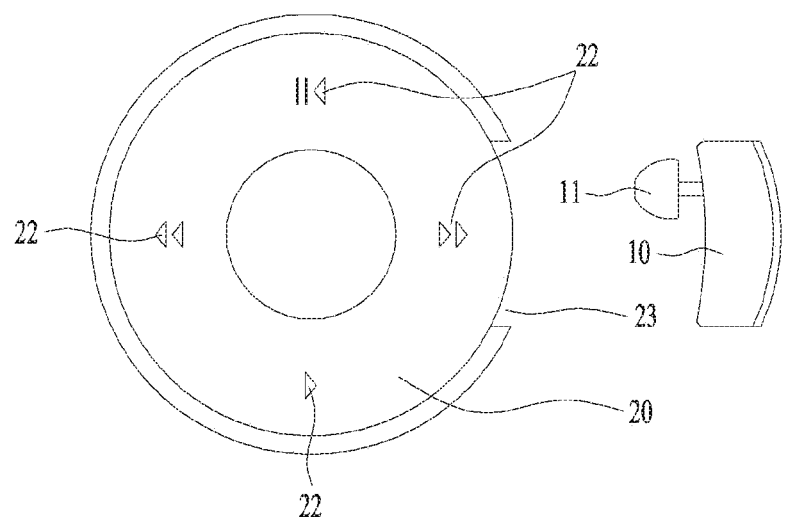
(a)
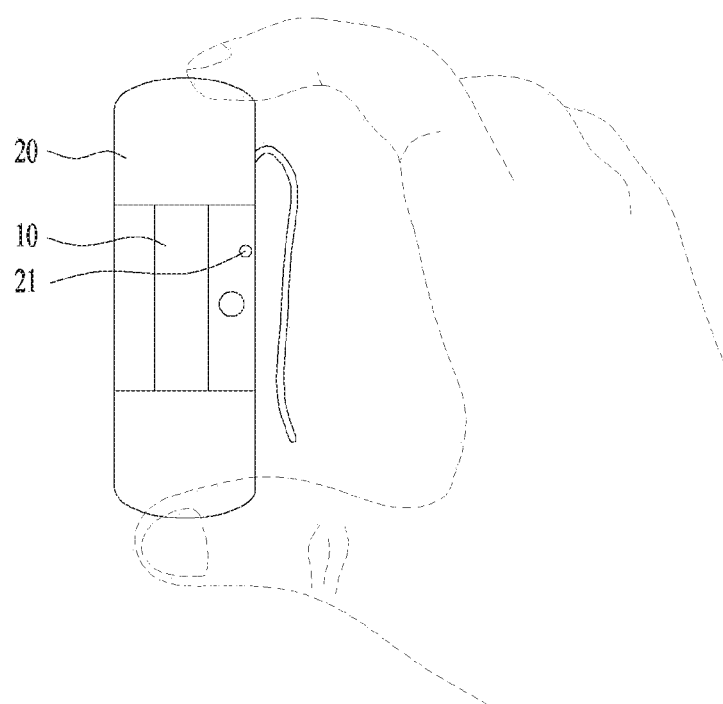
(b)

FIG. 2
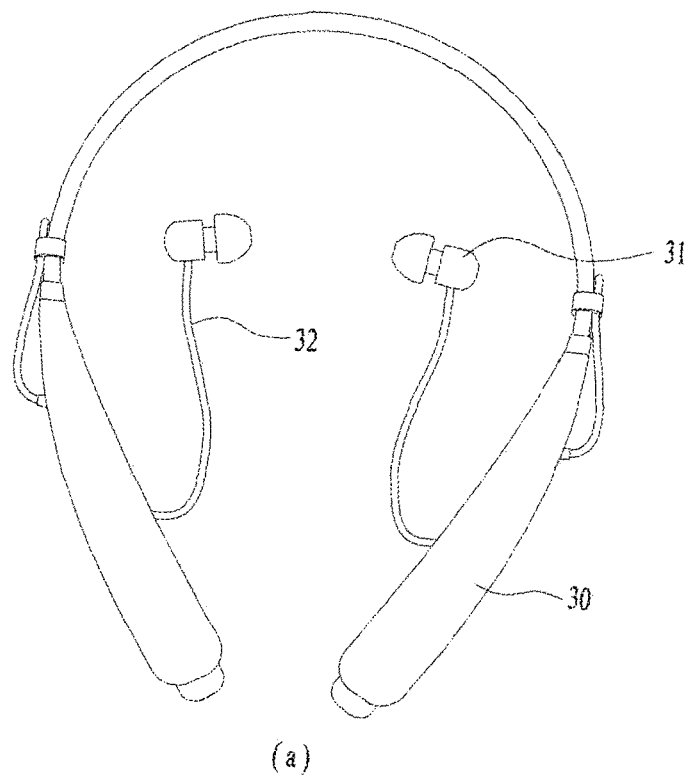
(a)
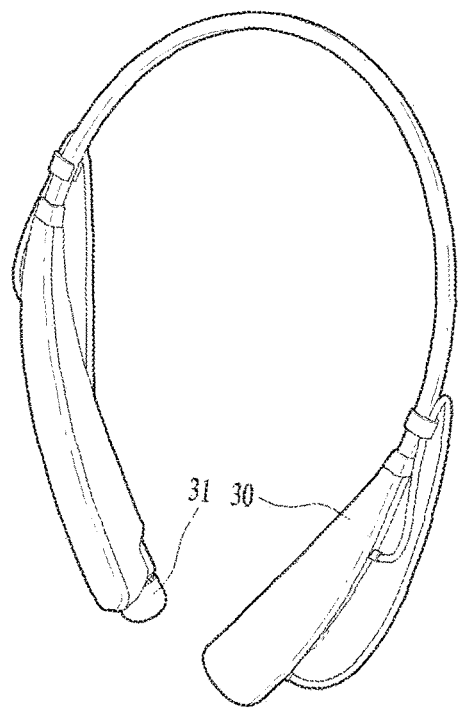
(b)

FIG. 3
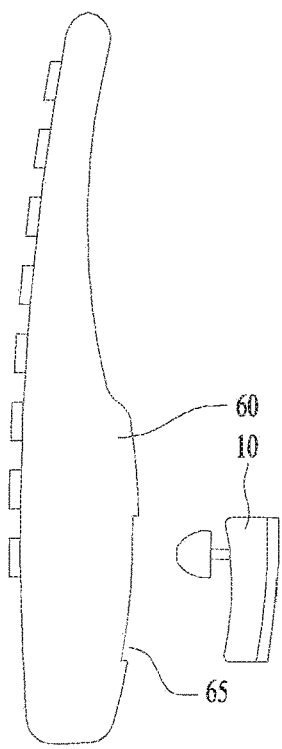
(a)
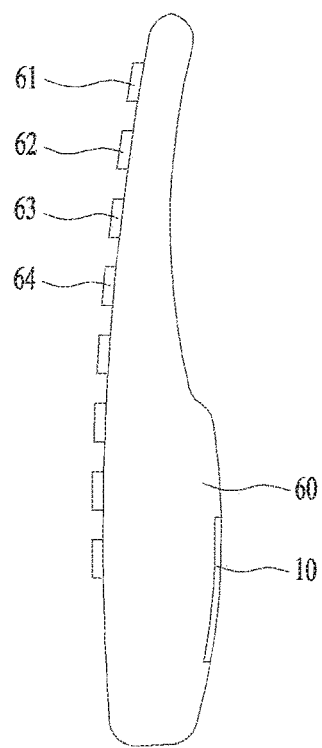
(b)

FIG. 17
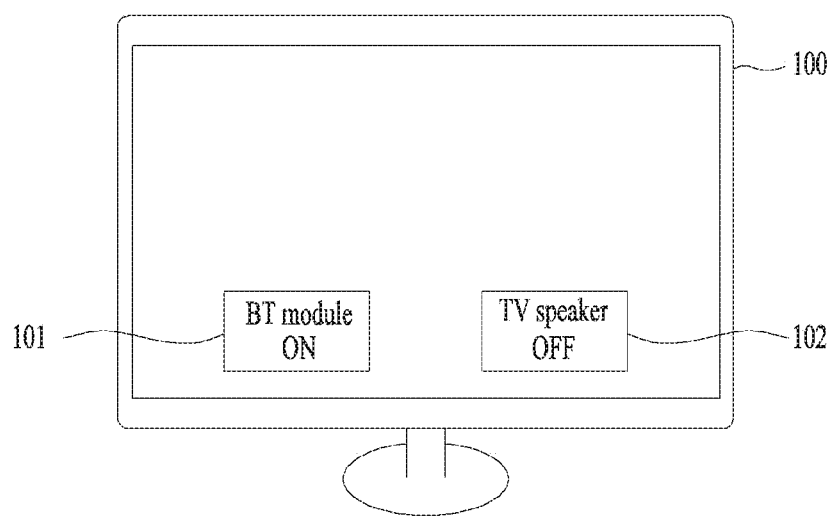
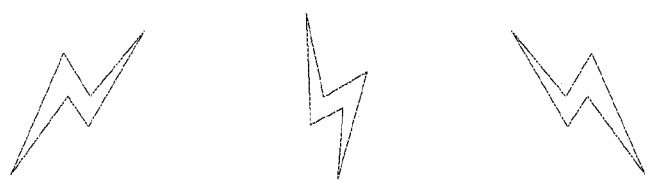

FIG. 19
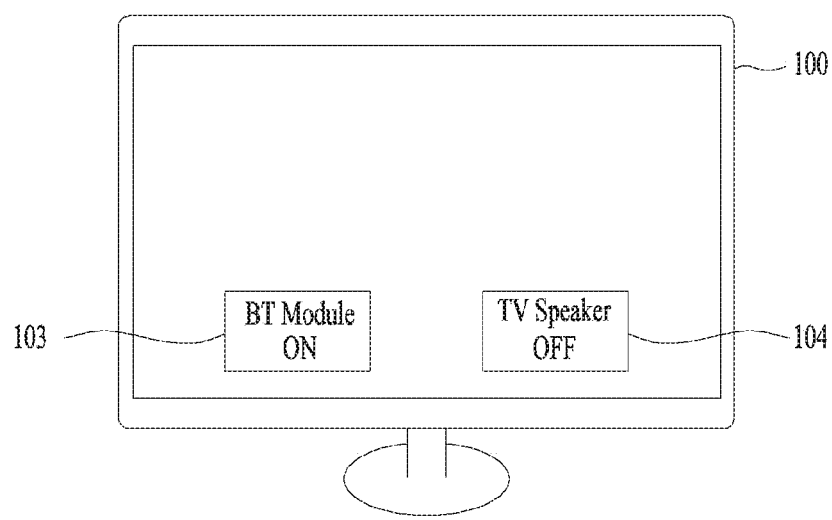

EARSET, EARSET SYSTEM, AND EARSET CONTROL METHOD

CROSS-REFERENCE TO RELATED PATENT APPLICATIONS

This application is a U.S. National Stage Application under 35 U.S.C. § 371 of PCT Application No. PCT/KR2016/009569, filed Aug. 29, 2016, which claims priority to Korean Patent Application No. 10-2015-0122866, filed Aug. 31, 2015, whose entire disclosures are hereby incorporated by reference.

FIELD

Embodiments of the present disclosure relate to an ear-set, an ear-set system and a method for controlling the same.

BACKGROUND

With recent development of wireless communication techniques, diverse ear-sets for wireless communication with audio-source devices are under development. Most latest developing ear-sets uses Bluetooth technique to be wirelessly connected with diverse types of audio source devices (e.g., a television, a smart phone, a navigation device for vehicles and the like) for communication and to wirelessly receive and output an audio signal.

However, a conventional ear-set has a disadvantage that a user with poor hearing is unable to use, because of no specifications for every user, and another disadvantage that a user might feel uncomfortable in use, because of no remote controller for controlling it together with conventional audio-source devices. In addition, when try to recognize external sounds in wearing the conventional ear-set, a user has to remove the ear-set from the ear or adjust an ear-set output volume with the hand inconveniently. Under such environments where the manual adjustment is not easy (e.g., bike-riding, jogging and the like), the conventional ear-set has a further disadvantage of dangerous accidents with the slightest provocation.

DETAILED DESCRIPTION OF THE INVENTION

Technical Problem

To overcome the disadvantages, one object of the present disclosure is to provide an ear-set which transmits an optimal audio signal for each preset user so that even a user with poor hearing can use the ear-set as a hearing aid.

Another object of the present disclosure is to provide an ear-set system which transmits an optimal audio signal to a user. The ear-set system includes an ear-set case and an ear-set housing with a remote controlling function and an audio source device.

A further object of the present disclosure is to provide an ear-set which is capable of handling dangerous situations and/or which allows a user to recognize external sounds easily so as to facilitate comfortable conversation with another person even while wearing the ear-set.

Technical Solution

To achieve these objects and other advantages and in accordance with the purpose of the embodiments, as embodied and broadly described herein, an ear-set comprises a communication module which is short-range communicable with an external audio source device and configured to receive an audio signal from the external audio source device; a memory in which user preset information is stored; an audio adjustment unit configured to adjust the size of the input audio signal based on the stored user preset information; and an ear-set case comprising an audio output unit configured to output the adjusted audio signal.

The ear-set may further comprise an ear-set housing which accommodates the ear-set case and has a remote control function configured to control the external audio source device.

The ear-set may further comprise the ear-set housing provides an electric charge to the ear-set case, in a state where the ear-set is coupled.

At least one of the ear-set setting menu, audio listening menu and hearing test menu may be executed on a display screen of the external audio source device by using the remote control function of the ear-set housing.

The audio listening level selected by a user from the audio listening menu may be stored in the memory as the user preset information by using the remote control function of the ear-set housing, and the audio adjustment unit may adjust the audio signal based on the stored user preset information.

When the hearing test menu is executed, the result of the corresponding hearing test may be stored in the memory as the user preset information by using the remote control function of the ear-set housing, and the audio adjustment unit may adjust the audio signal based on the stored result of the hearing test for each user.

The ear-set housing may comprise one or more exclusive user input button for controlling the ear-set case and the external audio source device.

The ear-set case may be decoupled from the ear-set housing, the audio output of the external audio source device is mute.

In another aspect of the present disclosure, an ear-set system comprises an audio source device comprising a memory in which user preset information is stored and configured to provide an adjusted audio signal to an ear-set case based on the user preset information; an ear-set case configured to receive the adjusted audio signal and provide the user with the adjusted audio signal; and an ear-set housing which accommodates the ear-set case and has a remote control function configured to control the external audio source device.

The ear-set housing may accommodate the ear-set in a predetermined area and provides an electric charge to the ear-set case, in a state where the ear-set is coupled.

At least one of the ear-set setting menu, audio listening menu and hearing test menu may be executed on a display screen of the external audio source device by using the remote control function of the ear-set housing.

The audio listening level selected by a user from the audio listening menu and the result of the user hearing test via the hearing test menu may be stored in the memory loaded in the audio source device as the user preset information.

In a further aspect of the present disclosure, an ear-set control method comprises a step for connecting an external audio source device with an ear-set case via a short range communication network and receiving an audio signal from the external audio source device; a step for generating user preset information on a display area of the external audio source device by using a remote control function of an ear-set housing accommodating the ear-set case and storing the generated user preset information; a step for adjusting the size of the received audio signal based on the stored user preset information; and a step for outputting the adjusted audio signal.

At least one of the ear-set setting menu, audio listening menu and hearing test menu may be executed by using the remote control function of the ear-set housing.

The audio listening level selected by a user from the audio listening menu may be stored as the user preset information The result of the user hearing test performed by the user from the hearing test menu is stored as the user preset information.

In a still further aspect of the present disclosure, an ear-set comprises a communication module which is short-range communicable with an external audio source device and configured to receive an audio signal from the external audio source device; a motion sensing unit configured to sense the amount of a user's motion; an external sound detection unit configured to detect the volume of an external sound; a control unit configured to generate a control signal to adjust the received audio signal, when the amount of the user's motion and the volume of the external sound are larger than preset values, respectively; an audio effect unit configured to convert the received audio signal into a predetermined sound effect according to the control signal of the control unit; and a mixing unit configured to mix and output the output the converted audio signal and the external sound.

The ear-set may further include an input button unit configured to receive a user's command requesting external sound recognition. When the user command requesting the external sound recognition is input via the input button unit, the control unit may control the received audio signal to be converted into the predetermined sound effect, regardless of the amount of the user's motion and the volume of the external sound.

The ear-set may further include an input button unit configured to receive a user's command requesting external sound recognition. When the user command requesting the external sound recognition is input via the input button unit, the control unit may compare the received audio signal with a preset size and control the received audio signal to be converted into a predetermined sound effect. The sound effect is formed by converting the received audio signal into a 3D-surround sound effect.

The predetermined amount of the motion and the predetermined volume of the external sound may be a default value set by the control unit or one of the values changed by the user.

In a still further aspect of the present disclosure, an ear-set control method comprises: a step for connecting an external audio source device with an ear-set case via a short range communication network and receiving an audio signal from the external audio source device; a step for sensing the amount of an ear-set user's motion and determining whether the amount of the motion is larger than a preset value; a step for detecting the volume of an ear-set external sound and determining whether the external sound volume is larger than a preset value; a step for converting the received audio signal into a preset sound effect, when the amount of the user's motion and the volume of the external sound are larger than preset values, respectively, based on the result of the determination; and a step for mixing and outputting the sound effect converted from the audio signal and the external sound.

In a still further aspect of the present disclosure, an ear-set control method comprises: a step for connecting an external audio source device with an ear-set case via a short range communication network and receiving an audio signal from the external audio source device; a step for receiving an audio signal from the external audio source device; a step for determining whether a user command requesting external sound recognition is input; a step for detecting the amount of the ear-set user's motion and the volume of the external sound, unless the user command requesting the external sound recognition is input based on the result of the determination, and converting the received audio signal into a predetermined sound effect, when the amount of the user's motion and the volume of the external sound are larger than preset values, respectively; a step for converting the received audio signal into the predetermined sound effect, regardless of the amount of the user's motion and the volume of the external sound, when a user command requesting external sound recognition is input based on the result of the determination; and a step for mixing and outputting the sound effect converted from the audio signal and the external sound.

Advantageous Effects

The effects of the wireless sound equipment according to the embodiments of the disclosure will be as follows. According to at least one of the embodiments, the ear-set, the ear-set system and the ear-set control method may provide the optimized audio signal to the ear-set user's hearing level. Especially, the user is able to easily input the setting via the external audio source device by providing the ear-set housing having the remote control function together with the ear-set.

Furthermore, the ear-set, the ear-set system and the ear-set control method may provide the external sound and the audio signal in the optimized method, when the external sound recognition is needed. Especially, the user wearing the ear-set is able to have conversation with the other people comfortably and quickly recognize a surrounding danger even while moving or exercising on the road.

BRIEF DESCRIPTION OF THE DRAWINGS

FIG. 1 is a diagram illustrating one embodiment of an ear-set case and an ear-set housing in accordance with the present disclosure;

FIG. 2 is a diagram illustrating another embodiment of an ear-set;

FIG. 3 is a diagram illustrating another embodiment of the ear-set case and the ear-set housing;

FIG. 17 is a diagram illustrating one example that two or more ear-set users are using the same external audio source device;

FIG. 19 is a diagram illustrating another example that an ear-set user and an no-ear-set user are using the same external audio source devices;

DESCRIPTION OF SPECIFIC EMBODIMENTS

Figure 4:
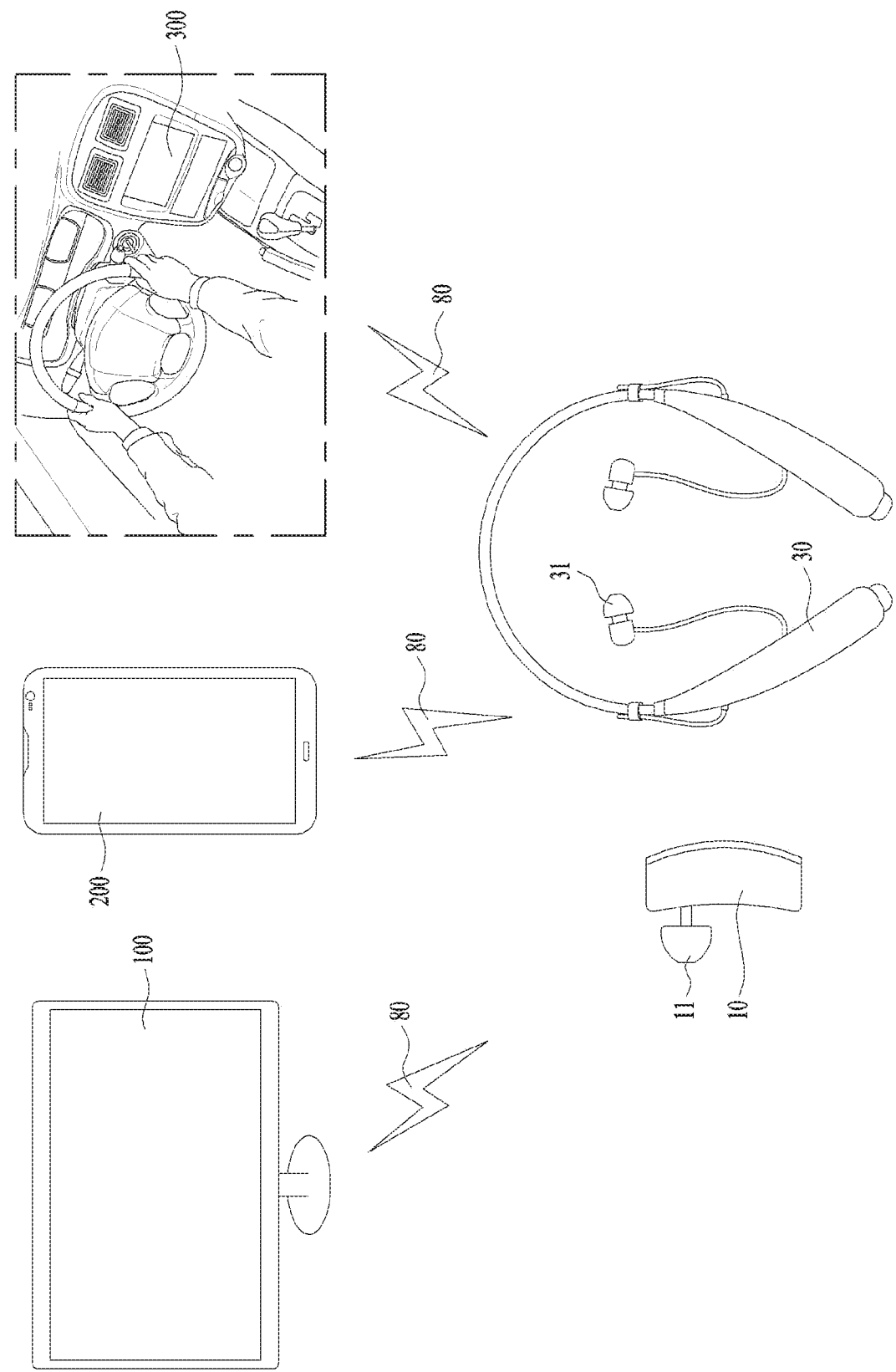
FIG. 4 is a diagram illustrating the ear-set and external audio source devices in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Especially, an ear-set which will be described in the present disclosure is one of user wearable devices configured to transmit an audio signal and called a headset or an earphone. For easy explanation, it is called the ear-set and it is obvious that technical features of the embodiments presented herein should not be limited by such the names.

FIG. 1 is a diagram illustrating one embodiment of an ear-set case 10 and an ear-set housing 20 in accordance with the present disclosure. The ear-set case 10 shown in FIG. 1 includes a speaker 11 functioned as ear-set output means. FIG. 1 (a) illustrates a state where the ear-set case 10 and the ear-set housing 20 are decoupled from each other. Especially, the ear-set housing 20 includes a storage space for storing the ear-set case 10. FIG. 1 (b) illustrates a state where the ear-set case 10 and the ear-set housing 20 are coupled to each other. After the coupling, an electric charge is automatically performed to the ear-set case 10 from the ear-set housing 20. As one selective option, an indicating light 21 may be provided in a predetermined portion of the ear-set housing 20 to display that the electric charge is ongoing after the ear-set case 10 is coupled to the ear-set housing 20 and a user input button 22 may be provided in another portion of the ear-set housing 20 to realize a remote control function for both the ear-set case 10 and external audio source devices.

FIG. 2 is a diagram illustrating another embodiment of an ear-set. The ear-set of FIG. 2 includes an ear-set case 30 and a speaker 31 which are connected thereto via a wire 32. FIG. 2 (a) illustrates a state where the ear-set is being used. A wired ear-set case 30 is wearable on the user's neck and the ear-set speaker 31 is insertedly wearable on the user's ear. FIG. 2 (b) illustrates a state where the ear-set is not being used. The structure for storing the ear-set speaker 31 in an end of the wired ear-set case 30.

FIG. 3 is a diagram illustrating another embodiment of the ear-set case 10 and the ear-set housing 60. For example, the ear-set case 10 shown in FIG. 3 has the same structure with the ear-set case 10 shown in FIG. 1, except that the ear-set housing 60 of FIG. 3 has combined functions of a conventional audio source remote controller function and the ear-set housing function in accordance with the present disclosure, which is different from the ear-set housing 20 of FIG. 1. In other words, the ear-set housing 60 of FIG. 3 may include a storage space 65 for storing the ear-set case 10. FIG. 3 (a) illustrates a state where the ear-set case 10 and the ear-set housing 60 are decoupled from each other. FIG. 3 (b) illustrates a state where the ear-set case 10 and the ear-set housing 60 are coupled to each other. After the coupling, an electric charge may be automatically performed in the ear-set body 10 from the ear-set housing 60. As an selective option, an indicating light (not shown) may be provided in a predetermined portion of the ear-set housing 60 to display that the electric charge is ongoing after the ear-set case 10 is coupled to the ear-set housing 60 and a plurality of user input buttons 61~64 may be provided in another portion of the ear-set housing 60 to realize a remote control function for both the ear-set case 10 and external audio source devices. Related with that, the remote control functions using the user input buttons 61~64 will be described in detail, referring to FIGS. 5 through 14.

FIG. 4 is a diagram illustrating the ear-set and external audio source devices 100, 200 and 300 in accordance with the present disclosure. The external audio source devices 100, 200 and 300 mean smart deices for providing an audio or voice signal to the ear-set 10 and 30. Examples of the external audio source devices include a smart television 100 of which a display function is highlighted, a smart phone 200 of which portability is highlighted, a smart display 300 configured to mounted in a vehicle for navigation and the like. In this instance, it is obvious that examples of the external audio source devices should include the other all types of devices capable of providing the audio or voice signal to the ear-set 10 and 30, except the smart devices mentioned above. To achieve the objects of the present disclosure, the audio source devices are characterized in having the minimum visual display area.

Related with that, communication modules for short range wireless communication 80 are loaded in the ear-set 10 and 30 and the audio source devices 100, 200 and 300, respectively. For easy explanation, a Bluetooth (hereinafter, BT) method which is one of the most widely used recently will be applied as the short range wireless communication module. However, the embodiments of the present disclosure are not limited thereto and diverse present or future communication methods or techniques which are standardized as the short range communication may be applied to the embodiments of the present disclosure.

Hereinafter, FIGS. 5-15 show an ear-set control method which uses the audio source devices. Especially, the ear-set control method in accordance with the present disclosure uses the remote control function of the ear-set housing 20 and 60 to use display areas of the audio source devices mentioned above. Next, the ear-set housing is the ear-set housing 60 shown in FIG. 3 and the audio source device is the smart television shown in FIG. 4 to use the ear-set control method.

Figure 5:
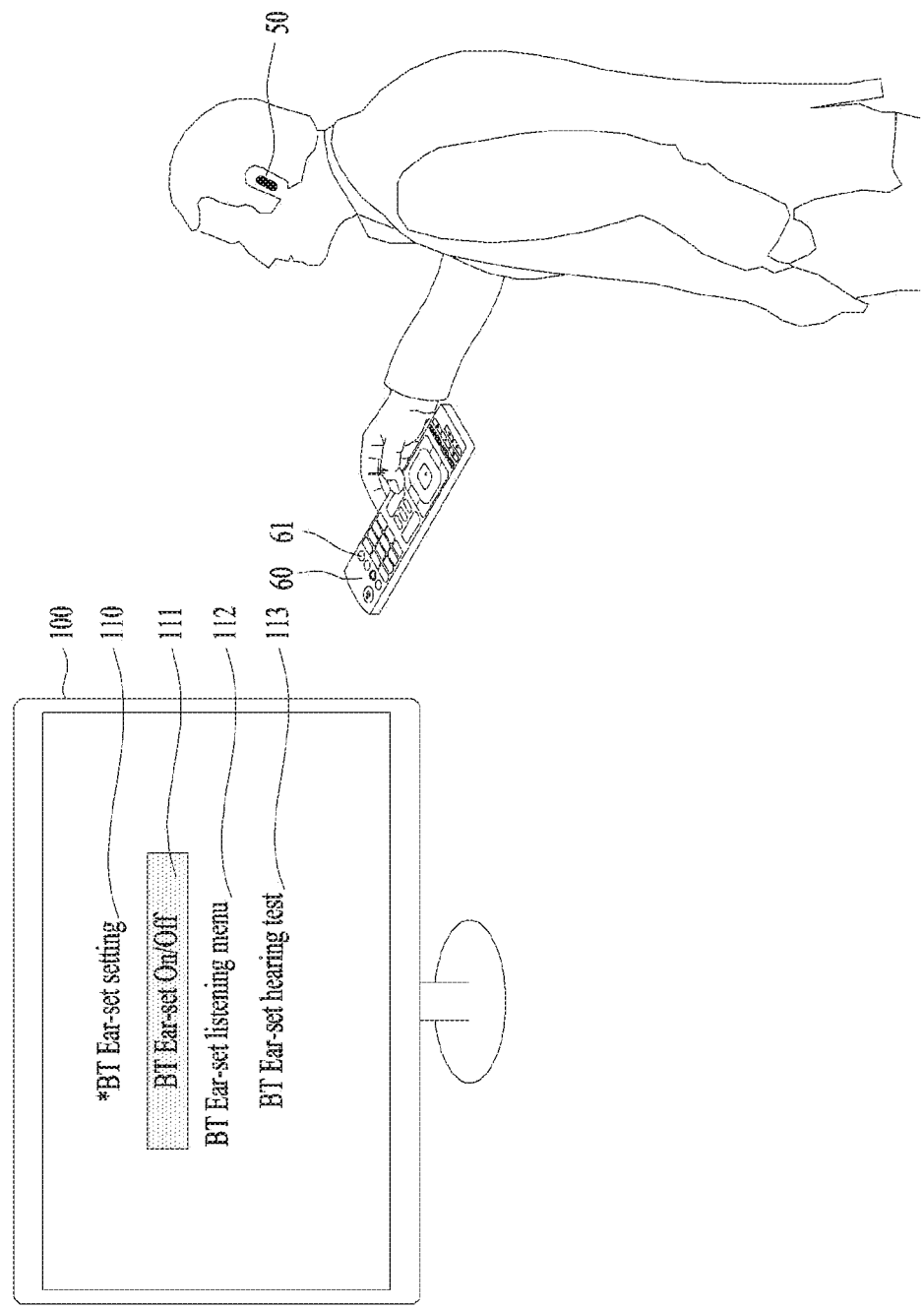
FIG. 5 is a diagram illustrating a start menu screen of a control method using the audio source devices in accordance with the present disclosure.

FIG. 5 is a diagram illustrating a start menu screen of a control method using the audio source devices in accordance with the present disclosure. A user of the ear-set 50 is able to perform ear-set setting by using the smart television 100. At this time, the user needs not be wearing the ear-set 50 and it is shown in the drawing that the user is wearing the ear-set 50. The ear-set 50 shown in FIG. 5 may have the structure of the ear-set 10 shown in FIG. 1 or the structure of the ear-set 30 shown in FIG. 2. When the user inputs a user command by using an ear-set start button 61 of the user input buttons provided in the ear-set housing 60, an ear-set start menu screen 110 is displayed on a display area of the smart television 100. The ear-set start menu 110 may include an ear-set setting menu 111, an ear-set listening menu 112 and an ear-set hearing test menu 113 or more. On the display screen may be activated a menu select window. When the ear-set start button 61 is pressed in a state where the menu select window is located on a desired specific menu, the corresponding menu may be executed. Hereinafter, a method for realizing the specific menus 111, 112 and 113 will be described in detail.

Figure 6:
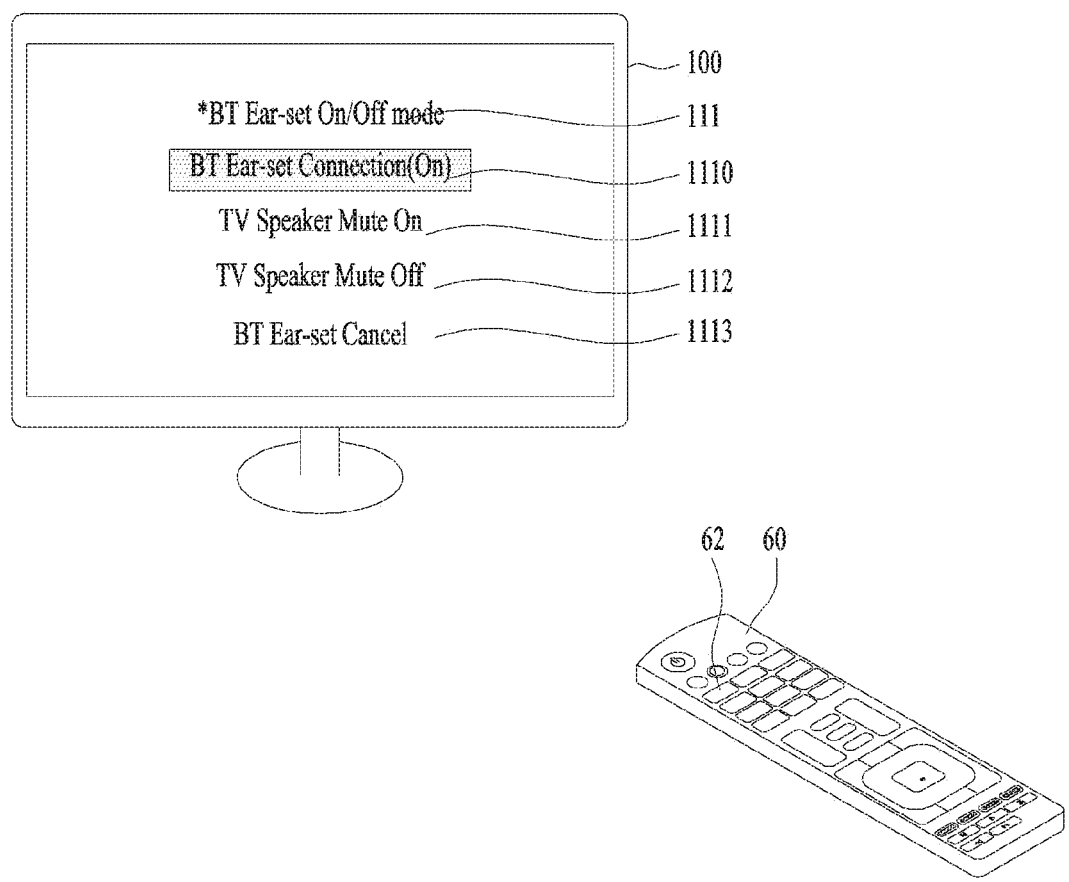
FIG. 6 is a diagram illustrating an ear-set setting menu in accordance with the control method using the audio source devices.

FIG. 6 is a diagram illustrating an ear-set setting menu in accordance with the control method using the audio source devices. Especially, the function of the ear-set setting menu 111 is characterized to use an ear-set setting button 62 of the user input buttons provided in the ear-set housing 60. If the ear-set housing 60 is combined with a conventional remote control, one of the input buttons used in the conventional remote control may replace the ear-set setting button 62. For example, a number '1' button of the conventional remote control may be used as the ear-set setting button 62 as shown in FIG. 6. That is, after the ear-set setting menu is selected by the ear-set start button 61 of FIG. 5 mentioned above, the conventional number '1' button may be used as the ear-set setting button 62. Accordingly, the number of the buttons arranged in the ear-set housing 60 can be reduced and no auxiliary buttons for controlling the ear-set need not be provided, when the ear-set housing is used as an integrated remote control.

FIGS. 7 through 10 are diagrams illustrating a control method for the ear-set setting menu 111 in accordance with the present disclosure.

Figure 7:
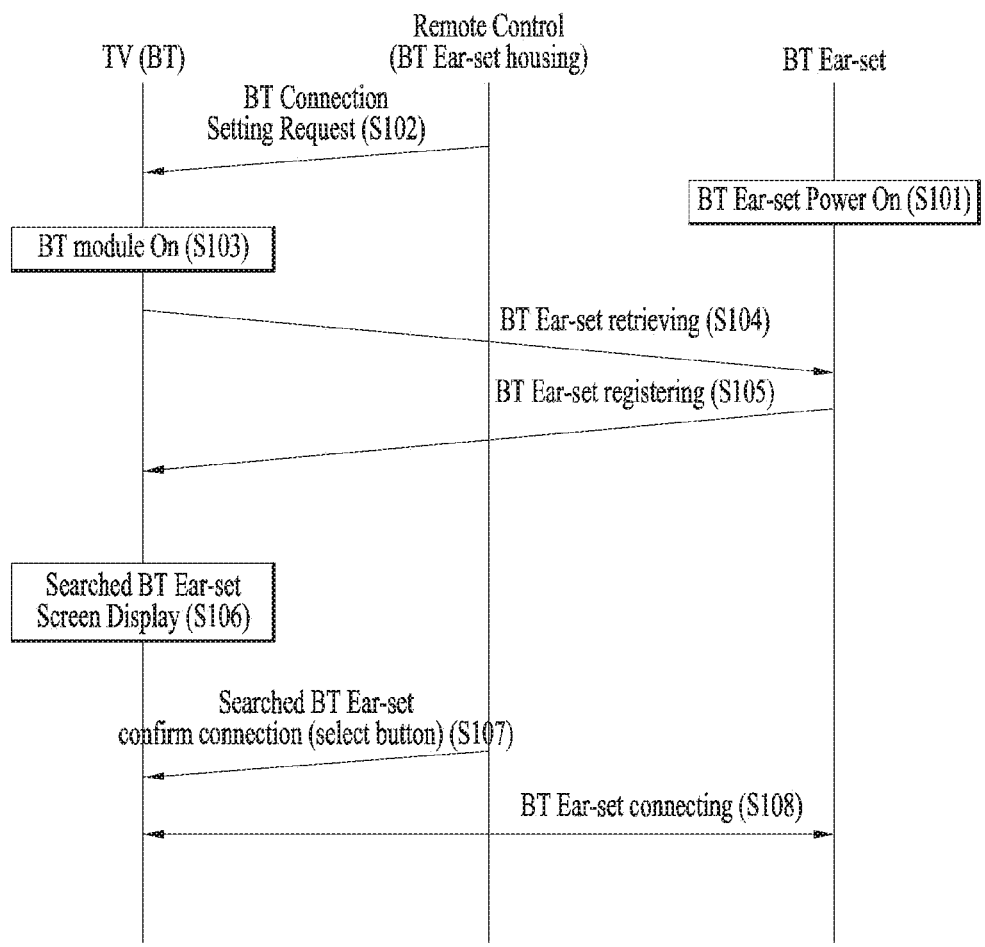
FIGS. 7 through 10 are diagrams illustrating a control method for ear-set setting in accordance with the present disclosure.

First of all, FIG. 7 illustrates flow of operations among the ear-set 50, the remote control functioned ear-set housing (60, hereinafter, "the ear-set housing") and the smart television 100, in case an ear-set connection On/Off menu 1110 of the ear-set setting menu 111.

In a state where the ear-set 50 is ready to be used after power-charged (S101), the user inputs a user command of the ear-set connection On/Off menu 1110 via the ear-set setting button 62 of the ear-set housing 60. According to the user command, the ear-set housing 60 transmits a control signal for Bluetooth connection setting with an ear-set recognized in a short range to the smart television 100 (S102). For that, short range communication has to be executable between the ear-set housing 60 and the smart television 100 and it is sufficient to exchange a simple control command via the ear-set housing 60, so that a conventional infrared (IR) communication remote control method can be used. However, the embodiments of the present disclosure are not limited thereto.

According to the command (S102), the smart television 100 may try to connect with the ear-set 50 wirelessly. In other words, the smart television 100 converts the wireless communication module to be on (S103) and retrieves Bluetooth devices including the ear-set 50 located near the smart television 100 (S104). The ear-set 50 registers the corresponding ear-set 50 as the wireless communication device which is short-range communicable (S105), corresponding to the result of the retrieving step (S104). The smart television 100 displays the ear-set registered in the step (S105) on the display (S106). At this time, the result of the retrieved Bluetooth devices nearby, except the ear-set 50, may be displayed on the display (S106). After that, the user may select one ear-set 50 desired to connect finally out of the registered wireless communicable devices displayed on the smart television 100 and input a OK button (S107). Hence, the smart television 100 and the ear-set 50 may keep the mutually connected state on the short range wireless communication network (S108). One of the diverse buttons provided in the ear-set housing 60, e.g., an executive command button or "enter" button) may be used as the OK button.

Figure 8:
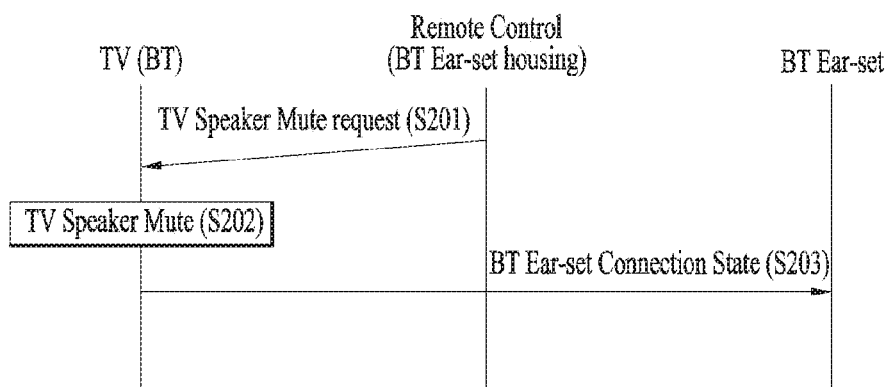

FIG. 8 shows flow of operations among the ear-set 50, the ear-set housing 60 and the smart television 100, when a TV-speaker-mute-on menu 111 of the ear-set setting menu 110 is selected. Related with that, the TV-speaker-mute-on menu-on menu 1111 may be executed when the ear-set setting button 62 is pressed on the ear-set start menu screen 110 twice in quick successions so that the number of the user input buttons can be effectively reduced by efficiently using the ear-set setting button 62.

Once the TV-mute-request is transmitted by the ear-set housing 60 (S201), the smart television 100 keeps a mute state while blocking the output of the speaker (not shown) (S202). In other words, the smart television 100 outputs an audio signal only to the ear-set 50 connected by Bluetooth communication (S203), so that the noise heard by the other people who are not watching TV can be reduced by preventing the repeated audio output via the TV speaker when receiving an audio signal via the ear-set 50. If the other people not using the ear-set 50 are watching TV together with the ear-set user (for example, what is shown in FIG. 19 which will be described later), the speaker mute request may not be recognized. Hereinafter, an ear-set control method in a situation where there are more than two users of the ear-sets and people who are not using the ear-sets will be described in detail, referring to FIGS. 17 through 20.

Figure 9:
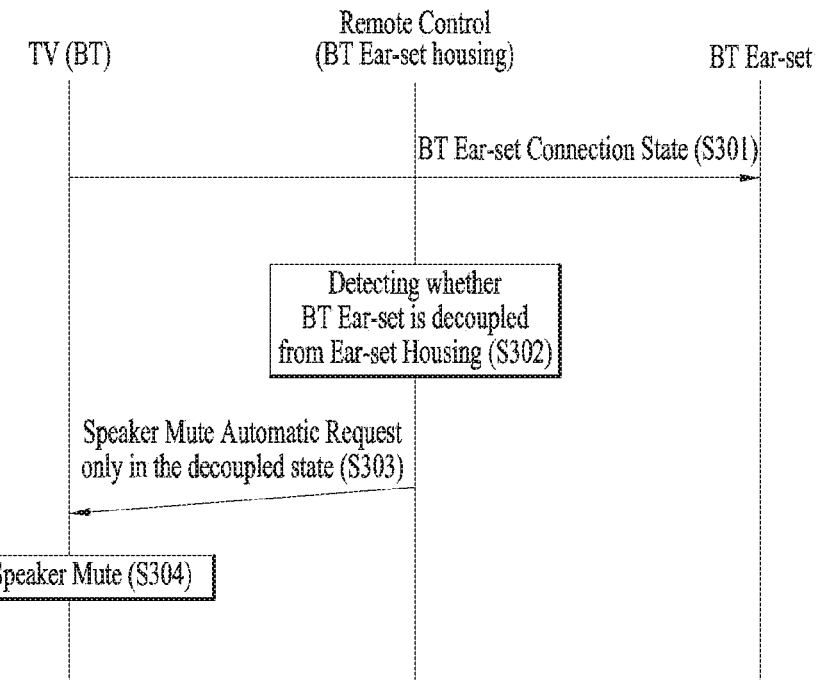

FIG. 9 shows another method for facilitating the TV-speaker-mute by using the ear-set housing 60. More specifically, the embodiment shown in FIG. 9 is characterized in that the TV-speaker-mute is executable by using the physical coupling between the ear-set housing 60 and the ear-set case 10 and 30, not using the TV-speaker-mute-on menu 1111 mentioned referring to FIG. 8. In a state where the Bluetooth communication connection between the smart television 100 and the ear-set 50 is executed (S301), the ear-set housing 60 recognizes that the ear-set case 10 and 30 is physically separated from the ear-set housing 60 (S302). When detecting a signal for indicating that the ear-set case 10 and 30 is decoupled from the ear-set housing 60 in the step of S302, the ear-set housing 60 transmits a command signal for a speaker-mute-on of the smart television 100 (S303). In response to the command signal, the smart television 100 keeps the mute-on state (S304) while shutting off the output of the speaker (not shown) therein. More specifically, the smart television 100 outputs an audio signal only via the ear-set case 10 and 30 connected by Bluetooth communication. The automatic-speaker-mute-on command of FIG. 9 is executable, without using the speaker-mute-on menu 1111 of the menu screen mentioned above. Accordingly, the user may be provided with the useful effects.

Figure 10:
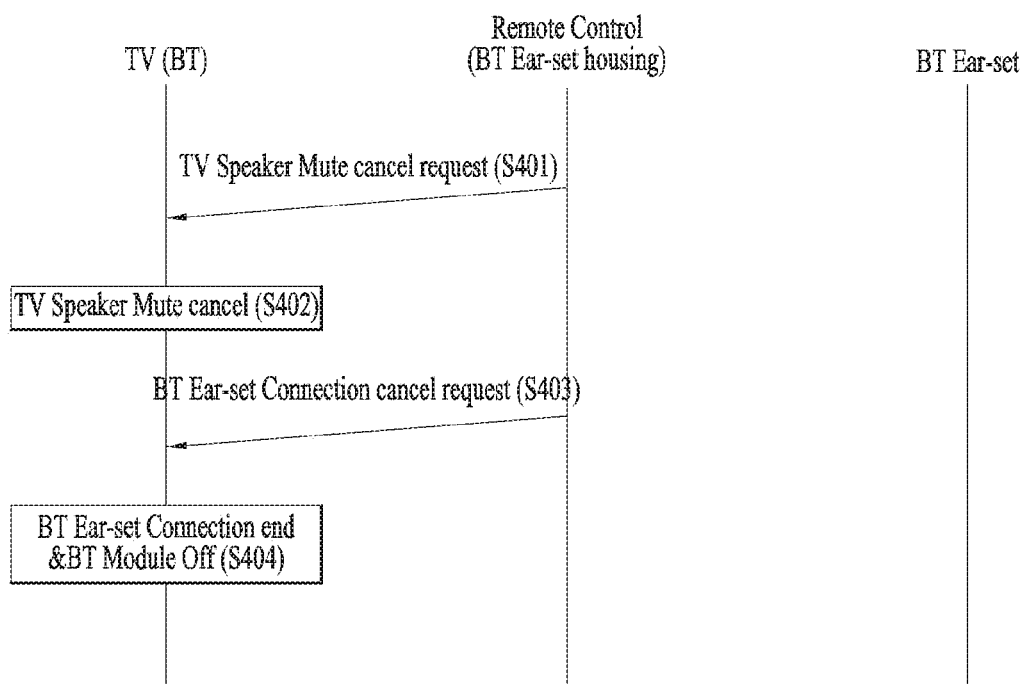

FIG. 10 shows that a TV-speaker-mute-off menu 1112 and/or an ear-set-connection-cancel menu 1113 of the ear-set setting menu 111 are selected. The TV-speaker-mute-off menu 1112 may be executable on the ear-set-start-menu screen 110 when the ear-set setting button 62 is pressed three times in quick succession. The ear-set-connection-cancel menu 1113 may be executable on the ear-set-start-menu screen 110 mentioned above, when the ear-set setting button 62 is pressed four times in quick succession. Accordingly, the number of the user input buttons may be reduced effectively by using the ear-set setting button 62 efficiently.

Figure 15:
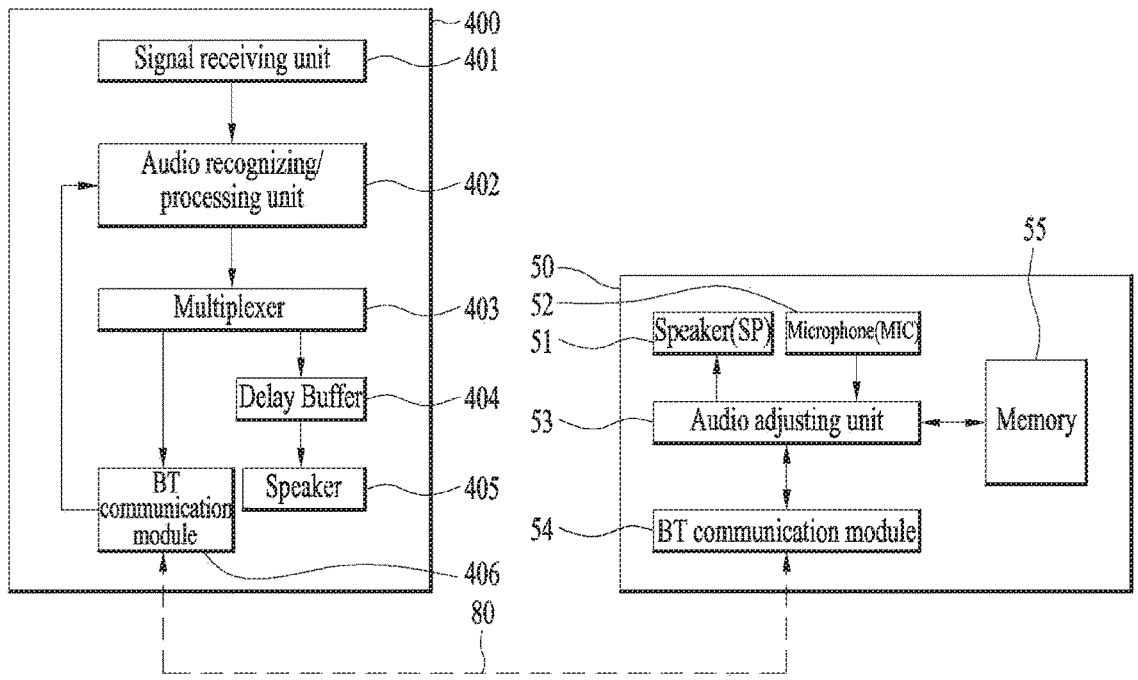
FIG. 15 is a diagram illustrating one example of specific configuration configured of the ear-set and the external audio source device.
Figure 16:
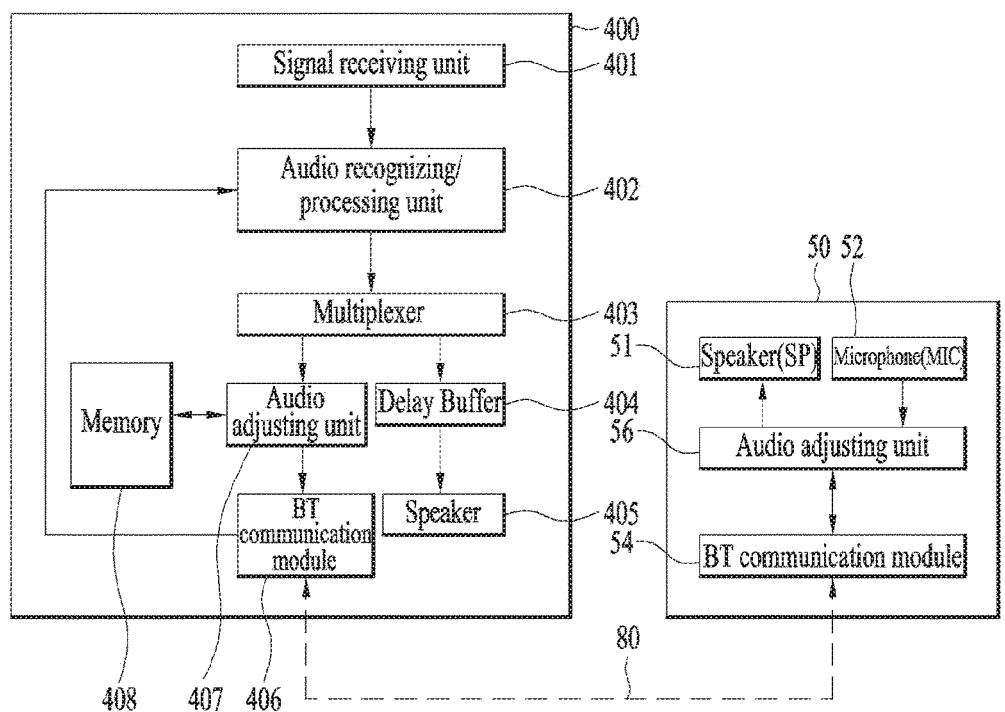
FIG. 16 is a diagram illustrating another example of the specific configuration configured of the ear-set and the external audio source device.

First of all, when a TV-speaker-mute-cancel request is transmitted by the ear-set housing 60 (S401), the smart television 100 cancels the speaker-mute state and keep the audio output via the speaker (S402). In other words, the smart television 100 outputs the audio signal to the ear-set 50 connected by Bluetooth communication, together with the speaker output simultaneously, which is especially useful when there are several persons who are watching TV, not using the ear-set 50 (for example, what is shown in FIG. 19 which will be described later). In this instance, the audio output is performed via the Bluetooth communication module and the speaker simultaneously so that it is required to compensate a time difference between the two outputs. FIGS. 15 and 16 shows that a delay buffer 404 is provided to compensate the time difference between the two outputs, which will be described in detail, referring to FIG. 15.

Next, in case the ear-set-connection-cancel menu 1113 is selected from the ear-set-start-menu screen 110, the ear-set housing 60 transmits an ear-set-connection-cancel command to the smart television 100 (S403). According to the command, the Bluetooth communication connection between the smart television 100 and the ear-set 50 is canceled and the smart television 100 switches off the communication module to return to the state before the connection (S404).

Figure 11:
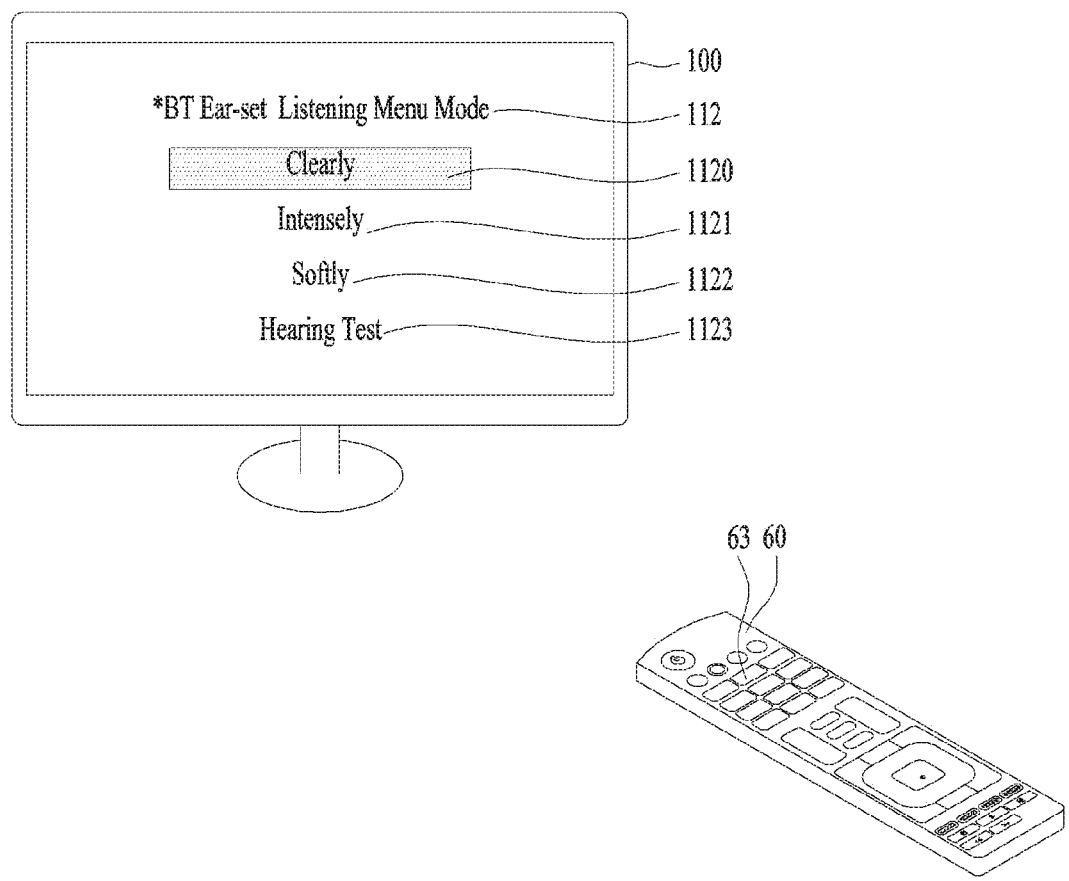
FIG. 11 is a diagram illustrating an ear-set hearing menu of the control method using the audio source devices.

FIG. 11 shows the ear-set-listening menu 112 of the control method using the audio source devices. An audio-listening-menu screen of FIG. 11 is executed when an audio listening menu 112 is selected from the ear-set start menu 111. The ear-set listening menu 112 is configured to allow the user to directly select characteristics of the audio signal received from the ear-set. For example, the user is able to directly select "clearly" 1120, "intensely" 1121, "softly" 1122 and such audio listening characteristics. Of course, other diverse listening menus may be provided, except the exemplified listening menu (1120/1121/1122). The listening menu may specify ages and nations. One specific audio-listening menu which is selected by the user may be recognized by the user as unique user preset information and stored in a memory (55, see FIG. 15) loaded in the ear-set 50 or memories (408, see FIG. 16) loaded in the audio source devices 100, 200 and 300 to be used by the user when using the ear-set 50, which will be described in detail later, referring to FIGS. 15 and 16.

Especially, the function of the audio listening menu 112 is characterized to use an audio-listening button 63 of the user input buttons provided in the ear-set housing 60. If the ear-set housing 60 is combined with the conventional remote control, one of the input buttons used in the conventional remote control may replace the audio listening button 63. For example, a number '2' button of the conventional remote control may be used as the audio listening button 62 as shown in FIG. 11 That is, after the ear-set setting menu is selected by the ear-set start button 61 of FIG. 5 mentioned above, the conventional number '2' button may be used as the audio listening button 62. Accordingly, the number of the buttons arranged in the ear-set housing 60 can be reduced and no auxiliary buttons for controlling the ear-set need not be provided, when the ear-set housing is used as an integrated remote control.

Figure 12:
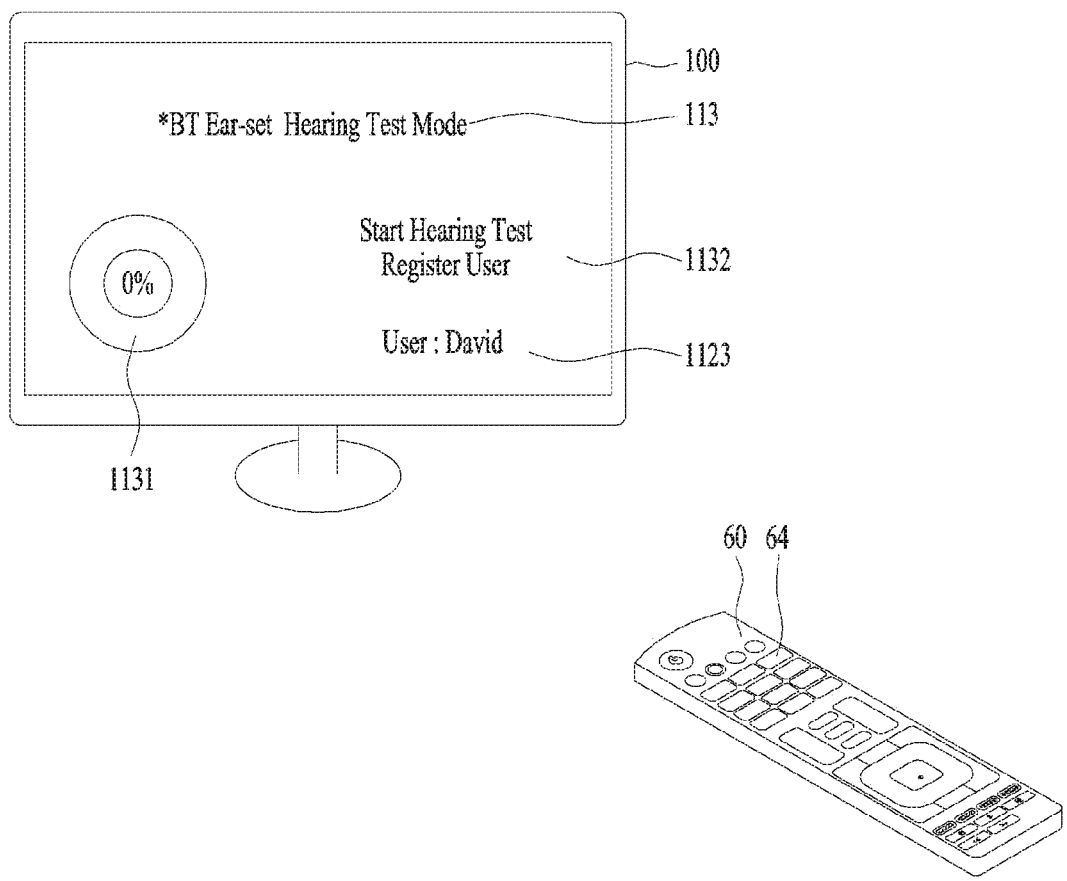
FIGS. 12 through 14 are diagrams illustrating a hearing test menu and a hearing test menu executing method of the control method using the audio source devices.
Figure 13:
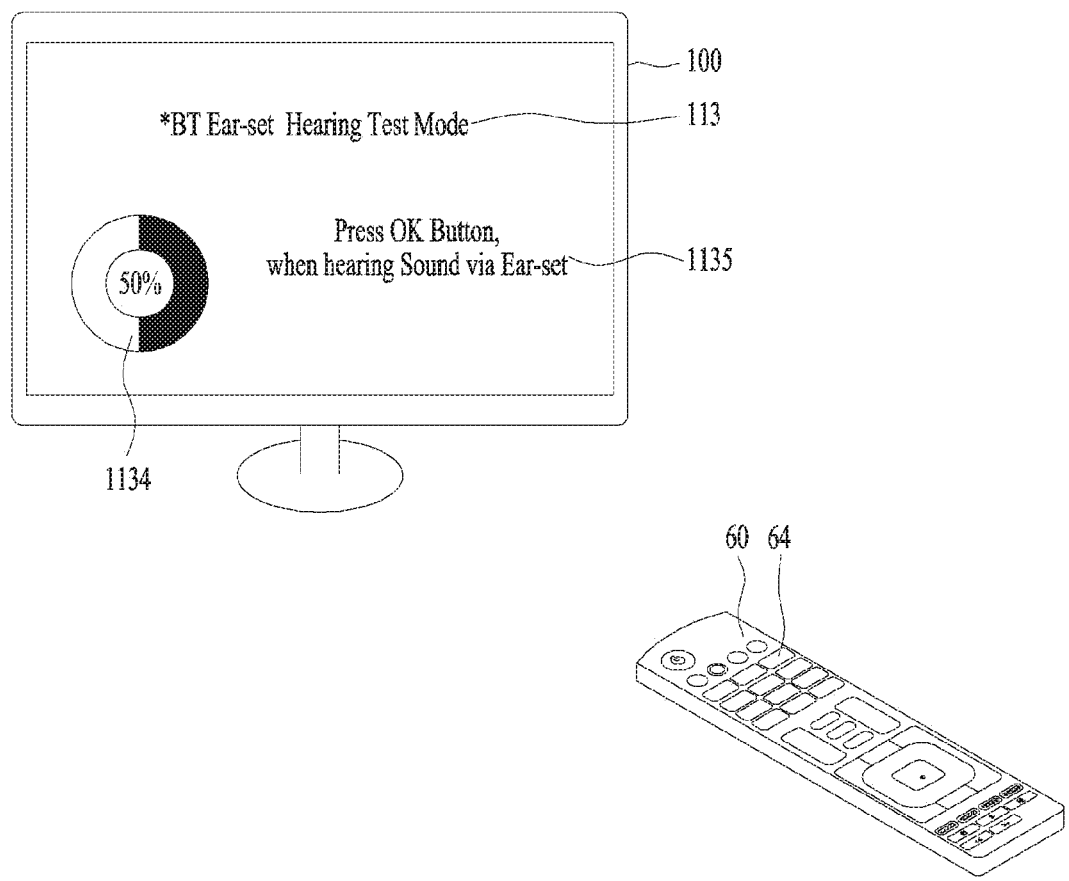
Figure 14:
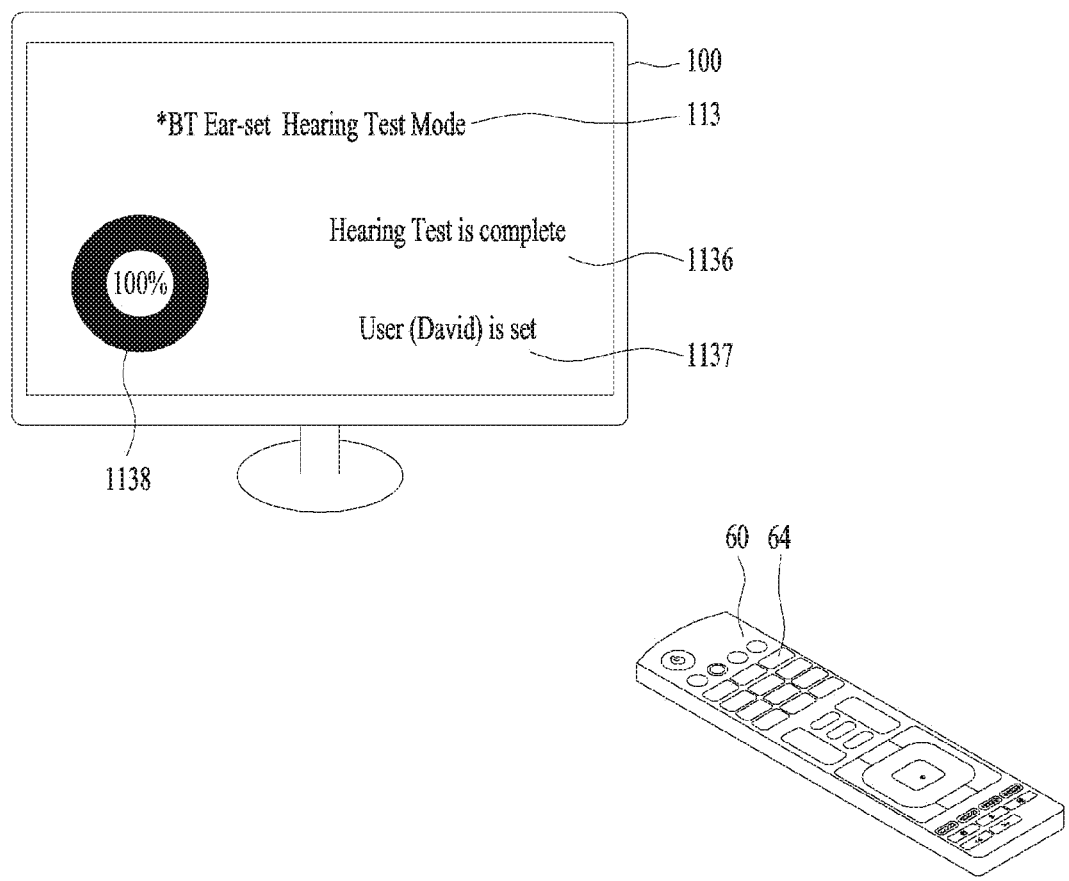

FIGS. 12 through 14 are diagrams illustrating a hearing test menu 113 and a hearing test menu executing method of the control method using the audio source devices. A hearing test start screen of FIG. 12 is executed when the hearing test menu 113 is selected from the screen of the ear-set start menu 113 or the hearing test menu 1123 is selected as shown in FIG. 11.

Especially, the hearing test menu 113 is characterized to use a hearing test button 64 of the user input buttons provided in the ear-set housing 60. If the ear-set housing 60 is combined with the conventional remote control, one of the input buttons used in the conventional remote control may replace the hearing test button 63. For example, a number '3' button of the conventional remote control may be used as the hearing test button 63 as shown in FIG. 12 That is, after the ear-set setting menu is selected by the ear-set start button 61 of FIG. 5 mentioned above, the conventional number '3' button may be used as the hearing test button 63. Accordingly, the number of the buttons arranged in the ear-set housing 60 can be reduced and no auxiliary buttons for controlling the ear-set need not be provided, when the ear-set housing is used as an integrated remote control.

FIG. 12 shows a hearing test start screen. The hearing test screen provides words of guidance 1132 for guiding a hearing test and inducing user registration and allows the user to register a user ID (1133). In a predetermined area of the hearing test start screen may be displayed a graphic and/or words of guidance which indicate the results of the ongoing hearing test (1131).

FIG. 13 shows a screen of the ongoing hearing test. The user performs the hearing test according to the guidance words on the display screen during the hearing test. For example, the smart television 100 transmits a specific signal level of a predefined sound (e.g., "bee") via the communication module and tests whether the ear-set user recognizes the corresponding sound level. For example, once the lowest level sound is transmitted, the display screen displays the guidance words 1135 of "press OK button if heating a sound from the ear-set". At this time, the hearing test button 64 mentioned above may be used as the OK button. When hearing a specific sound from the ear-set, the ear-set user presses the hearing test button 64. If not heating the specific sound, the ear-set user takes no actions. The hearing test process gradually increases the signal level of the sound to the user recognizable level. The result of the hearing test process is provided by using the guidance graphic and/or words (1134). During the test, the guidance graphic and/or words 1134 may not be provided.

FIG. 14 shows a screen of hearing test completion. The smart television 100 provides a graphic 1138 and/or words 1136 for guiding that the user hearing test is complete, together with words 1137 for guiding the registered user ID. Once the hearing test is complete, the result of the hearing test is recognized as user unique information for the preset user ID and stored in the memory (55, see FIG. 15) of the ear-set 50 or the memory (408, see FIG. 16) of the audio source device 100, 200 and 300, to be used when the ear-set 50 is worn. Accordingly, even a user with the poor hearing registers his or her hearing characteristics as the user information and the user is able to hear the audio signal which is adjusted to be proper to the ear-set user's hearing characteristics.

FIGS. 15 and 16 are diagrams illustrating one example of specific configuration configured of the ear-set 50 and an external audio source device 400. The external audio source device 400 may be one of the audio source devices 100, 200 and 300 mentioned above, referring to FIG. 4 or another corresponding audio source device.

FIG. 15 illustrates that the ear-set 50 includes a memory 55 in which user preset information is stored. FIG. 16 illustrates that the audio source device 400 includes a memory 408 in which the user preset information is stored.

As shown in FIG. 15, the audio source device 400 includes a signal receiving unit 401 configured to receive an audio signal from an external device; and an audio-recognition/process unit 402 configured to replay the received audio according to a preset play format. The signal receiving unit 401 may be understood as broadcasting reception module, for example. When the received signal is a composite signal having video, the audio recognition/process unit 402 separates only the audio signal from the video and plays the separated audio signal based on the preset audio format (e.g., MPED, AAC and the like). The played audio is multiplexed by a multiplexer 403 and transmitted to the ear-set 50 nearby via the Bluetooth communication module 406 or output via the speaker 405 provided in the audio source device 400. If the simultaneous output via the Bluetooth communication module 406 and the speaker 405 is necessary, a delay buffer 404 may be further provided before the input of the speaker 405 as the means for compensating a time difference between the two outputs. The reason why the time difference compensation is necessary is to prevent the deterioration of the audio performance caused by the interference of the signals generated by the time difference between the two audio outputs. The conventional time difference is 10 ms or less which is difficult to be recognized by the user. However, if such the time differences accumulate, the user could recognize the time differences. A system control unit (not shown) may drive a compensation algorithm for the time differences by using the delay buffer 404 one or several times before the user recognizes the time differences.

The ear-set 50 includes the Bluetooth communication module 54 which is communicable with the audio source device 400 to receive the audio signal from the audio source device 400. The ear-set 50 further include a memory 55 in which user preset information of the current ear-set user (e.g., audio hearing characteristics, the hearing test result and the like). The ear-set 50 may further include an audio adjustment unit 53 configured to adjust the size of the received audio signal based on the user preset information stored in the memory 55. The finally adjusted audio signal is transmitted to the user via the ear-set speaker 51. Accordingly, the ear-set user is able to hear the optimized audio signal according to the embodiment of the present disclosure. Especially, even a user who needs a hearing aid because of the poor hearing is able to automatically hear an audio signal according to a proper hearing level which is determined based on the result of the hearing test. Accordingly, the ear-set user need not raise an output volume of the audio source device or the ear-set speaker intentionally. For example, if the ear-set user watching the smart television 100 together with other people raises the output volume of the audio source device 400 according to only his or her hearing level, the other people will not hear the undesired high level audio signal. In other words, the speaker output of the smart television 100 is kept as a preset level and the ear-set user is provided with the optimized audio signal to the hearing level via the ear-set 50.

The ear-set 50 may selectively include a microphone 52. The microphone 52 is used in performing a phone call function or transmitting a voice command of a voice recognition function by using the ear-set 50. Also, the microphone 52 may be used for an external sound detection function configured to recognize external sounds which will be described in detail, referring to FIGS. 21 through 23.

For the phone call function and the voice recognition command function via the ear-set microphone 52, the audio source device 400 is provided with the voice signal received from the microphone 52 via the communication modules 54 and 406 and then processes the signal via the audio recognition/process unit 402.

FIG. 16 is a diagram illustrating another example of the specific configuration configured of the ear-set 50 and the external audio source device. FIG. 16 shows that the memory 408 storing the user preset information is provided in the audio source device 400, not the ear-set 50. A signal receiving unit 401, an audio recognition/process unit 402, a multiplexer 403, a Bluetooth communication module 406, a speaker 405 and a delay buffer 404, which are provided in the audio source device 400 shown in FIG. 16, are equal to the corresponding elements of the audio source device shown in FIG. 15 and the detailed description thereof is omitted accordingly. According to the embodiment of FIG. 16, the audio source device 408 may further include the memory for storing the ear-set user preset information and it may further include an audio adjustment unit 407 configured to adjust the size of the audio signal according to a specific ear-set user by using the user preset information stored in the memory 408.

A Bluetooth communication module 54, a speaker 51 and a microphone 52, which are provided in the ear-set 50 shown in FIG. 16, are equal to the corresponding elements of the ear-set shown in FIG. 16 and detailed description thereof is omitted accordingly. According to the embodiment of FIG. 16, the ear-set 50 is configured to the audio signal optimized to the ear-set user's hearing level so that it can be used only in manually adjusting the output volume of the ear-set speaker 51.

FIG. 17 is a diagram illustrating one example that the more than two ear-set users are using the same external audio source device. For example, more than two sear-set users 601, 602 and 603 who are wearing ear-sets 50-1, 50-2 and 50-3, respectively, are watching the smart television 100.

Figure 18:
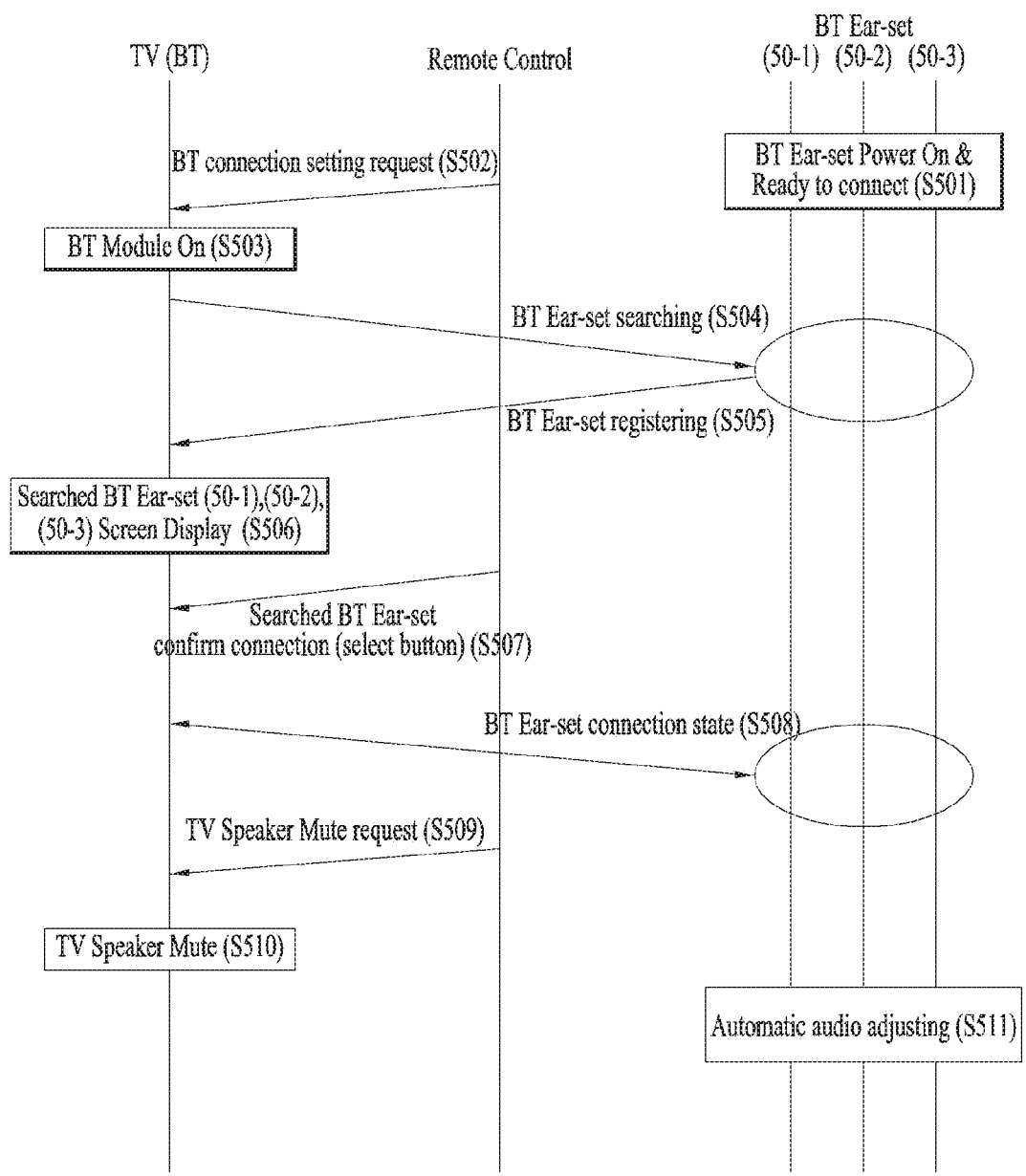
FIG. 18 is a diagram illustrating an ear-set setting control method for two or more ear-set users shown in FIG. 17.

FIG. 18 is a diagram illustrating an ear-set setting control method for the more than two ear-set users shown in FIG. 17. In a state where the ear-sets 50-1, 50-2 and 50-3 are ready to use after the electric charge (S501), the user requests the ear-set connection setting by using the remote control (or the ear-set housing 60 mentioned above) (S502). According to the user command, the Bluetooth communication module of the smart television 100 is switched on (101, S503) and the ear-sets 50-1, 50-2 and 50-3 located in a communicable short range are retrieved (S504). In response to the result of the retrieving, the ear-sets 50-1, 50-2 and 50-3 are registered to the smart television 100 as Bluetooth communicable devices (S505). After that, the smart television 100 displays the ear-sets registered in the step S505 on the display (S506). At this time, the result of the searching for the other peripheral Bluetooth devices as well as the ear-sets 50-1, 50-2 and 50-3 may be displayed. Hence, each of the ear-set users 601, 602 and 603 selects his own ear-set from the wireless communicable devices displayed on the smart television 100 and requests Bluetooth communication connection (s507). From this point, the smart television 100 and the ear-sets 50-1, 50-2 and 50-3 may keep the mutual connection via a Bluetooth communication network (S508, 80). The entire users watching the smart television 100 are wearing the ear-sets so that they can request the speaker-mute (S509) and that the speaker output of the smart television 100 may be shut off in response to the request (S510, 102).

Each of the ear-set users 601, 602 and 603 is able to set the audio listening level he or she desires from the ear-set listening menu screen of FIG. 11 as the user information or set the hearing level selected from the hearing test screen of FIGS. 12 through 14 as the user information. When the user preset information is stored in each of the ear-set memory 55, the corresponding ear-set automatically adjusts the size of the received audio signal based on the stored user preset information and output the size-adjusted audio signal (S511).

FIG. 19 is a diagram illustrating another example that an ear-set user and a no-ear-set user are using the same external audio source devices. For example, only one ear-set user 701 is wearing the ear-set 50-4 and the other people 702 and 703 is watching the smart television 100, without wearing the ear-sets. In this instance, the ear-set 50-4 may be connected with the smart television 100 via Bluetooth communication according to the ear-set setting method of FIG. 7. The ear-set 50-4 stores the user preset information in the ear-set memory 55 by using what is mentioned referring to FIGS. 11 and 12 through 14 so that it may provide the ear-set user 701 with the audio signal according to the user's (701) audio hearing characteristic and desired audio listening mode. While, the non-ear-set users or wearers 702 and 703 are provided with the audio signal from the speaker. Accordingly, the speaker mute of the smart television 100 for the ear-set user 701 is canceled and the speaker has to consistently keep the on-state (104).

Figure 20:
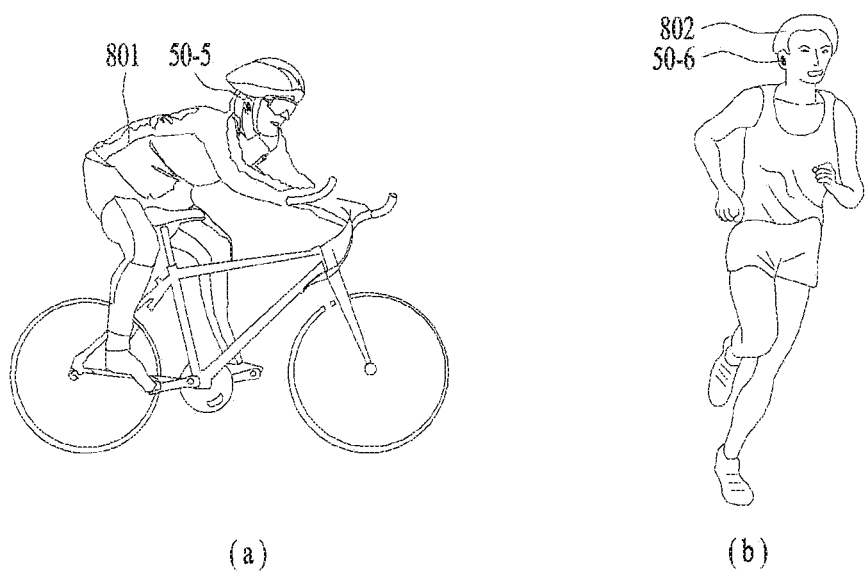
FIG. 20 is a diagram illustrating one example of ear-set user using forms.

FIG. 20 is a diagram illustrating one example of ear-set user using forms. FIG. 20 (a) illustrates that one user 801 wearing the ear-set 50-5 is riding a bicycle and FIG. 20 (b) illustrates that one user wearing the ear-set 50-6 is jogging. For example, the users 801 and 802 receives the audio signal (e.g., listening to music) from the audio source device such as a smart phone 200 via Bluetooth communication and listens to the audio signal via the ear-set 50-5 and 50-6. In this instance, the user wearing the ear-set 50-5 and 50-6 on the ears could not recognize ambient noise or vehicle warning sounds easily. For example, when a dangerous vehicle is approaching near the ear-set users 801 and 802, they are unable to hear a vehicle warning sound at the right time and there is a danger of an accident. When trying to have conversation with surrounding people 702 and 703 in the embodiment shown in FIG. 19, the ear-set user 701 could not recognize the conversation with the opposite people 702 and 703 properly in a state of wearing the ear-set 50-4. Hereinafter, FIGS. 21 through 24 illustrates a method for easily recognizing ambient noise or vehicle warning sounds even while wearing the ear-set will be described to solve the disadvantage.

Figure 21:
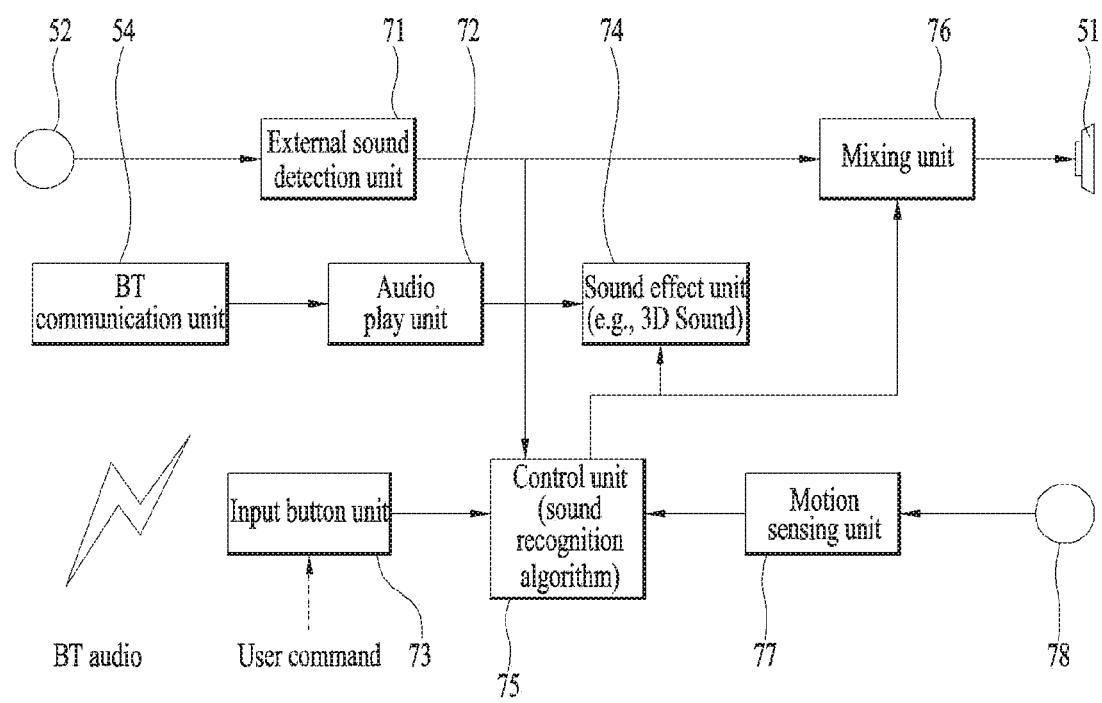
FIG. 21 is a diagram illustrating an internal structure of the ear-set.

FIG. 21 is a diagram illustrating an internal structure of the ear-sets 50-4, 50-5 and 50-6. The ear-set in accordance with the embodiment of FIG. 21 includes a microphone 52 configured to collect external sounds; a communication module 54 which can short range communication (e.g., Bluetooth) with the external audio source device; a user input button unit 73 (e.g., an acceleration sensor) configured to receive a user command; a motion sensor configured to sense the ear-set user's motion; and an ear-set speaker 51. Especially, the input button unit 73 includes a plurality of buttons and at least one of the physical buttons is related with the user command for requesting external sound recognition. In other words, when desiring to recognize external sounds, the user may request the external sound recognition by using the corresponding physical button.

The ear-set 50-4, 50-5 and 50-6 in accordance with the embodiment of FIG. 21 includes an external sound detection unit 71 for detecting the volume of the external sound transmitted from the microphone 52; an audio play unit configured to replay the audio signal transmitted from the communication module 54 based on a preset play format; and a motion sensing unit 77 configured to detect the amount of the user's motion from a value sensed by the motion sensor 72.

The ear-set 50-4, 50-5 and 50-6 in accordance with the embodiment of FIG. 21 further include a control unit 75. After receiving the signals from the external sound detection unit 71, the input button unit 73 and the motion sensing unit 77, the control unit 75 generates a control signal for indicating the processing of a sound effect from the received signals to the audio signal played in the audio play unit 72. In addition, the control unit 75 controls the audio signal having the sound effect processed therefrom to be output together with the external sound. For example, the control unit 75 may include a sound recognition algorithm software program and the sound recognition algorithm software program is configured to provide external ambient sounds to the ear-set user 701, 801 and 802 efficiently.

The ear-set 70 in accordance with the embodiment of FIG. 21 may further include a sound effect unit 74 configured to implement a sound effect of the audio signal according to the control signal of the control unit 75; and a mixing unit 76 configured to output the sound effect processed audio signal together with the external according to the control signal of the control unit 75.

For example, the sound effect may have 3D-sound effect. When the 3D-sound effect is applied to the audio signal, the audio signal may provide the user with the sound effect which sounds from a backside or a top of the user's head. Accordingly, the ear-set user 701, 801 and 802 is able to hear external sounds nearby as a main output sound of the ear-set speaker 51 clearly and the received audio single as the 3D-sound effect consistently, only to more efficiently use the ear-set.

Figure 22:
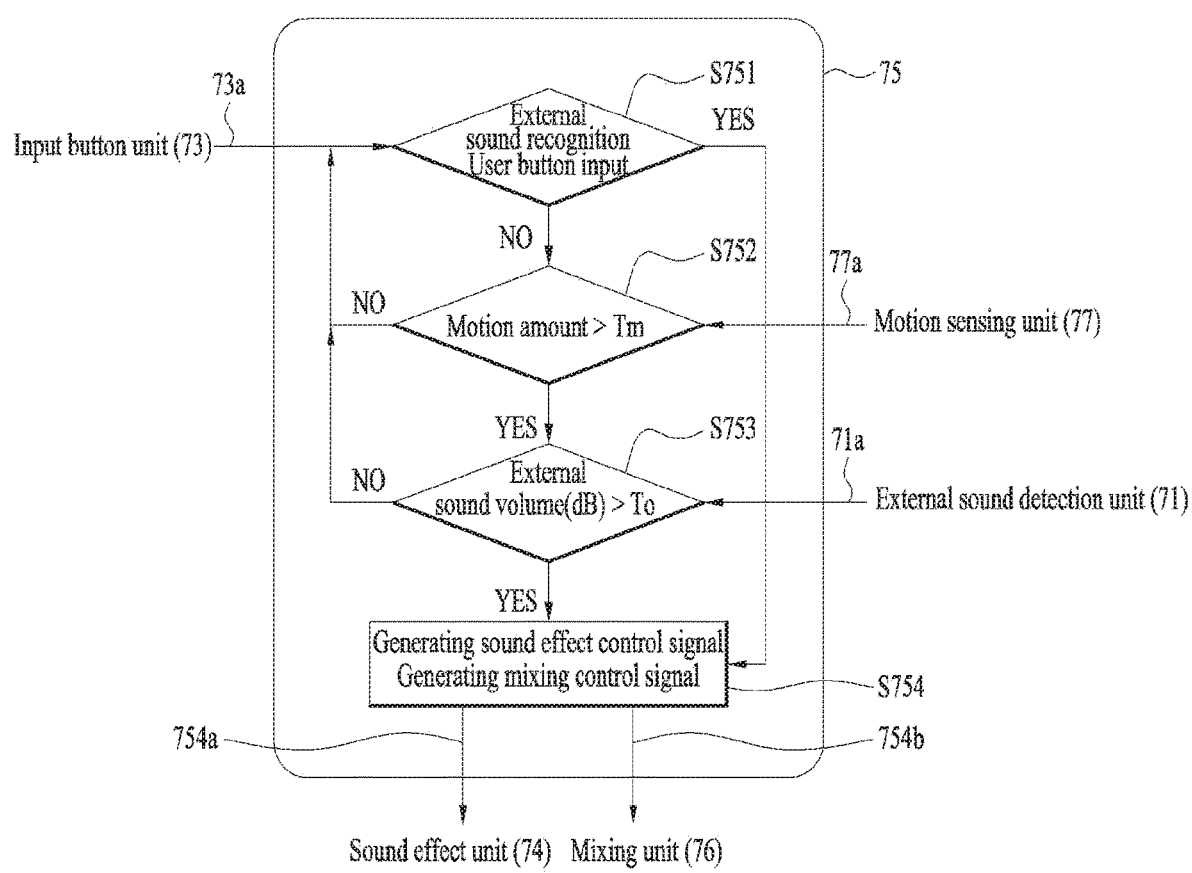
FIG. 22 is a diagram illustrating specific operations of a control unit 75 shown in FIG. 21.

FIG. 22 is a diagram illustrating specific operations of the control unit 75 shown in FIG. 21. The control unit 75 determines whether the user command 73a for requesting the external sound recognition is input via the input button unit 75 (S751). If it is determined that the user command 73a for requesting the external sound recognition is input, the control unit 75 generates a sound effect control signal 754a and a mixing control signal 754b, regardless of the determination on the other input. The sound effect control signal 754a is transmitted to the sound effect unit 74 mentioned above and control the sound effect unit 74 to realize the sound effect in the input audio signal. The mixing control signal 754a is transmitted to the mixing unit 76 mentioned above and control the mixing unit 76 to output the sound effect processed audio signal and the external signal simultaneously.

The input button unit 75 may be realized in a preset area of the ear-set 50-4, 50-5 and 50-6 as physical button. Alternatively, a physical input button is provided in the ear-set housing 10 and 60 mentioned above and transmitted to the ear-set 50-4, 50-5 and 50-6. The user command 73a for requesting the external sound recognition is input when the user directly recognizes external sounds in a state with no conversation or motion. For example, when needing conversation with the people nearby 702 and 703 while washing the start television 73, the ear-set user wearing the ear-set 50-4 generates the user command 73a for requesting the external sound recognition. In response to the user request, the ear-set 50-4 outputs ambient external sound (e.g., the opponent party's voice during the conversation) as the main sound and the audio signal output from the smart television 100 is divided into 3D-sound and the sound effect to be output. Accordingly, the ear-set user 701 is able to have conversation with the opponent party even while wearing the ear-set.

In the step S751, unless the user command 73a for requesting the external sound recognition is input, the control unit 75 receives information 77a about the amount of the user's motion from the motion sensing unit 77 and compares the received amount of the motion with a preset reference value (Tm) (S752). If the received amount of the motion is larger than the reference value (Tm) in the comparison step (S752), the next step S753 is executed (YES flow). If the received amount of the user's motion is smaller than the reference value (Tm), it returns to the former step S751 (NO flow). The system automatically set the reference value (Tm) by expecting the attention-requiring motion based on the normal amount of the user's motion. Or, the desired reference value (Tm) for each user may be set by using the ear-set housing 20 and 60 or the audio source device 100, 200 and 300.

In the next step S753, the control unit 75 receives information about the volume of the external sound (the information 71a about a decibel (dB)) from the external sound detection unit 71 and compared the received volume of the external sound with a preset reference value (To) (S753). If the input volume of the external sound is larger than the reference value (To) based on the result of the comparing step S753, the control unit 75 generates and transmits the sound effect control signal 754a and the mixing control signal 754b to the sound effect unit 74 and the mixing unit 76, respectively. the sound effect unit 74 realizes a 3D-sound effect for the audio signal according to the sound effect control signal 754a and the mixing unit 76 outputs both the sound-effect-processed audio signal and the external sound simultaneously according to the mixing control signal 754b. if the volume of the external sound received in the comparing step S753 is smaller than the reference value (To), it returns to the former determining step S751 (NO flow). The reference value (To) may be automatically set by the system based on the attention-needing degree expected from a normal volume (dB) of external sound. Or, a reference value (To) of the external sound desired by each user may be set by using the ear-set housing 20 and 60 or the audio source device 100, 200 and 300.

More specifically, even in a state without the user command input 73a requiring the external sound recognition, the control unit 75 may perform the steps 752 and 753 so as to automatically change the output of the ear-set speaker and set the external sound as the main sound and convert the audio signal into the sound effect sound, when the amount of the user's motion is larger than the preset value and the external sound is larger than the preset volume (To). Accordingly, the user is able to easily recognize ambient sounds even in a dangerous situation.

Figure 23:
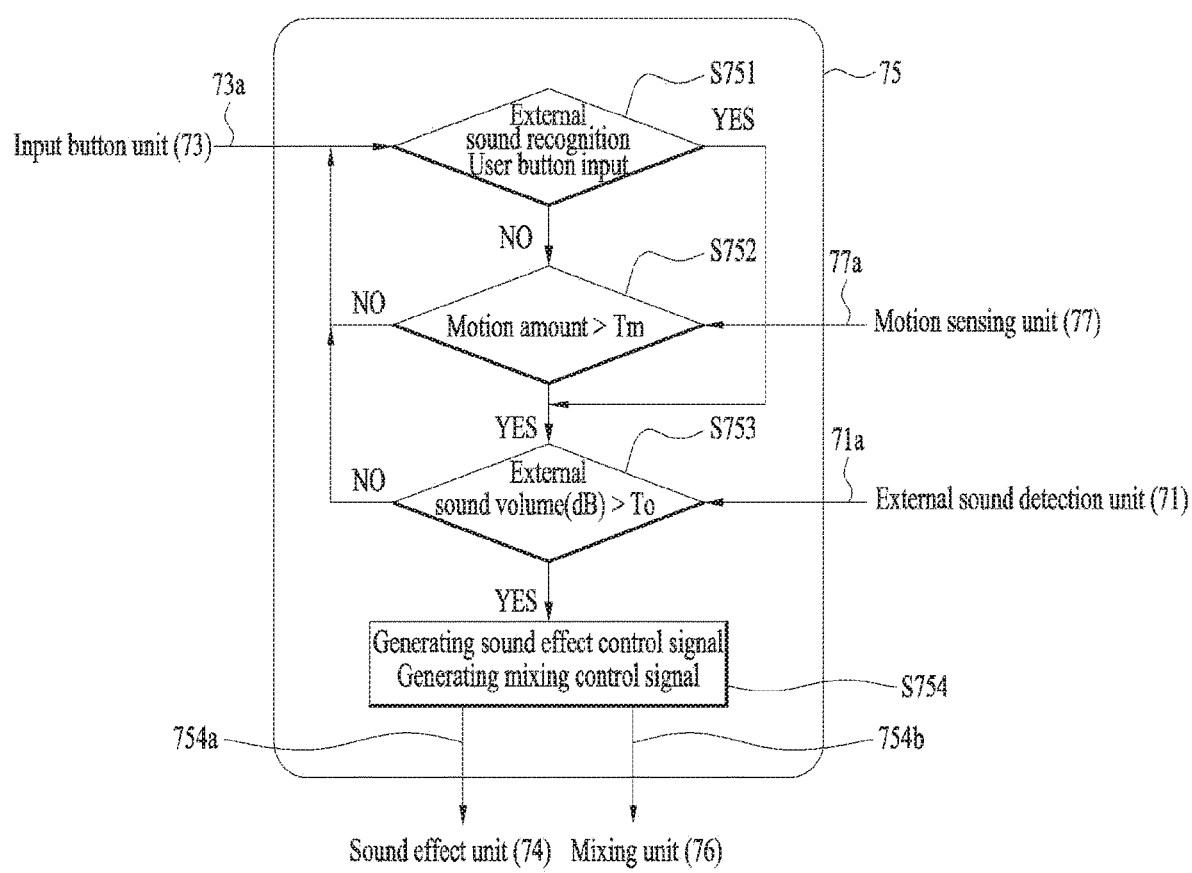
FIGS. 23 and 24 are modified embodiments of FIG. 22.
Figure 24:
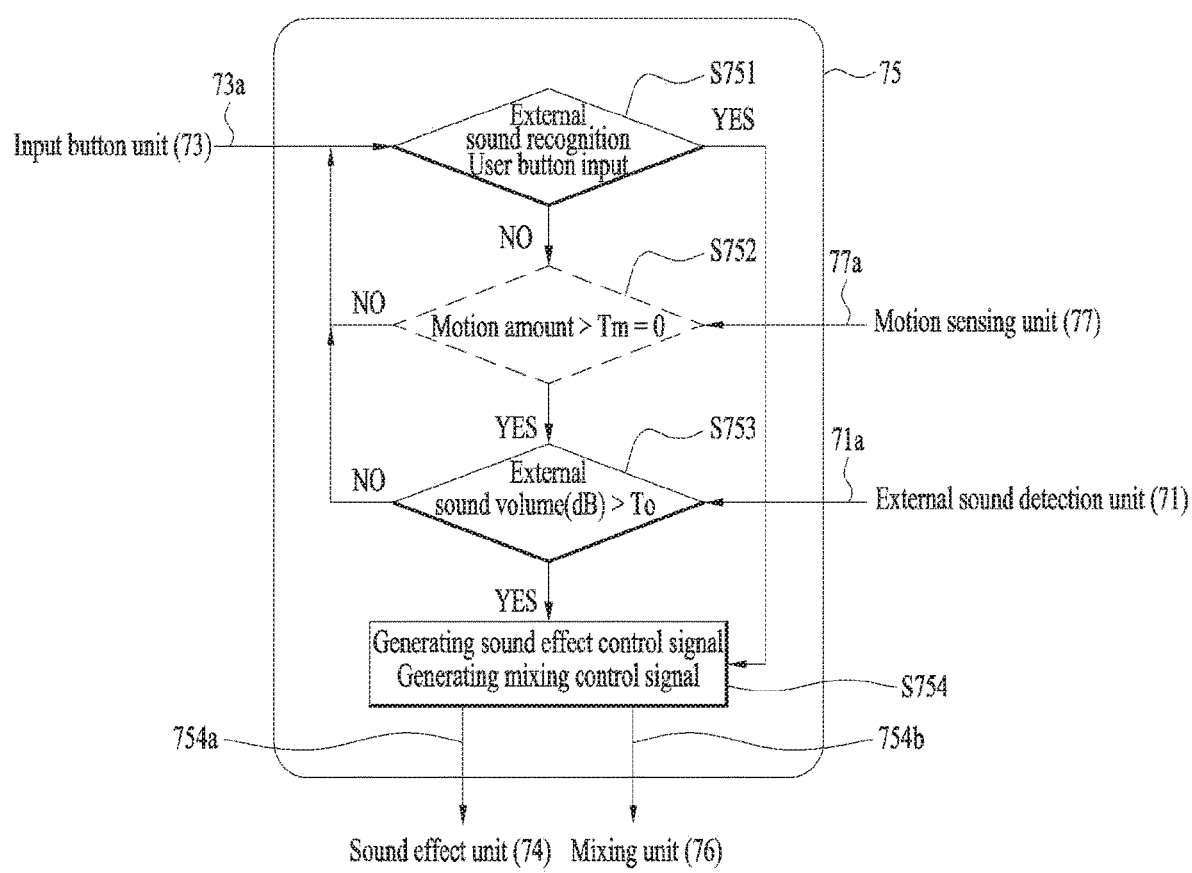

FIGS. 23 and 24 are modified embodiments of FIG. 22. In FIG. 23, when the user command input 73a for requesting the external sound recognition is input in the step S751 mentioned above, the step S753 starts to determine whether the volume of the external sound is larger than the preset value (To). Accordingly, only in case that the preset volume or more of the external sound is input even when the user command is input, it is preferred that the sound effect unit 74 and the mixing unit 75 is controlled.

Hence, FIG. 24 illustrates an embodiment that the step S752 of FIG. 22 is deleted (shown in a dotted line) or the reference value (Tm) of the motion amount is set as "0 (zero)". In other words, in accordance with the embodiment shown in FIG. 24, when the user command 73a is input or the volume of external sounds is larger than a preset value (To), the sound effect unit 74 and the mixing unit 76 may be controlled, regardless of the user's motion.

INDUSTRIAL APPLICABILITY

Various embodiments described herein may be implemented in a computer-readable medium, a machine-readable medium, or similar medium using, for example, software, hardware, or any combination thereof. The computer-readable medium includes all types of recording devices in which the data readable by a computer system is stored. Examples of computer-readable medium may include HDD (Hard Disk Drive), SSD (Solid State Disk), ROM, RAM, CD-ROM, a magnetic tape, a floppy disk, an optical data storage device and the like. In addition, such examples may include a carrier wave device (e.g., an internet transfer technique using device). The computer may include a control unit 180 of a terminal. Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ear-set comprising:
a communication module that is short-range communicable with an external audio source device and configured to receive an audio signal from the external audio source device;
a memory to store user preset information;
an audio adjustment unit configured to adjust a size of the input audio signal based on the stored user preset information;
an ear-set case comprising an audio output unit configured to output the adjusted audio signal; and
an ear-set housing that accommodates the ear-set case,
wherein when the ear-set case is determined to be physically separated from the ear-set housing, the ear-set housing sends a command signal to the external audio source device to mute an audio output of the external audio source device and the audio output of the external audio source device is muted corresponding to the command signal.

2. The ear-set of claim 1, further comprising:
the ear-set housing that has a remote control function configured to control the external audio source device.

3. The ear-set of claim 2, further comprising:
the ear-set housing provides an electric charge to the ear-set case, when the ear-set case is coupled to the ear-set housing.

4. The ear-set of claim 3, wherein at least one of an ear-set setting menu, audio listening menu and hearing test menu is executed on a display screen of the external audio source device by using the remote control function of the ear-set housing.

5. The ear-set of claim 4, wherein an audio listening level selected by a user from the audio listening menu is stored in the memory as the user preset information by using the remote control function of the ear-set housing, and
the audio adjustment unit adjusts the audio signal based on the stored user preset information.

6. The ear-set of claim 4, wherein when the hearing test menu is executed, a result of the corresponding hearing test is stored in the memory as the user preset information by using the remote control function of the ear-set housing, and
the audio adjustment unit adjusts the audio signal based on the stored result of the hearing test for each user.

7. The ear-set of claim 2, wherein the ear-set housing comprises one or more exclusive user input button for controlling the ear-set case and the external audio source device.

8. An ear-set system comprising:
an audio source device comprising a memory to store user preset information and configured to provide an adjusted audio signal to an ear-set case based on the user preset information;
the ear-set case configured to receive the adjusted audio signal and provide a user with the adjusted audio signal; and
an ear-set housing that accommodates the ear-set case and has a remote control function configured to control the audio source device,
wherein when the ear-set case is determined to be physically separated from the ear-set housing, the ear-set housing sends a command signal to the audio source device to mute an audio output of the audio source device and the audio output of the audio source device is muted corresponding to the command signal.

9. The ear-set system of claim 8, wherein the ear-set housing accommodates the ear-set case in a predetermined area and provides an electric charge to the ear-set case, when the ear-set case is coupled to the ear-set housing.

10. The ear-set system of claim 8, wherein at least one of ear-set setting menu, audio listening menu and hearing test menu is executed on a display screen of the audio source device by using the remote control function of the ear-set housing.

11. The ear-set system of claim 10, wherein an audio listening level selected by a user from the audio listening menu and a result of a user hearing test via the hearing test menu are stored in the memory of the audio source device as the user preset information.

12. An ear-set control method comprising:
connecting an external audio source device with an ear-set case via a short range communication network;
sending a command signal to the external audio source device to mute an audio output of the external audio source device when the ear-set case is determined to be physically separated from an ear-set housing, wherein the ear-set housing accommodates the ear-set case;
receiving an audio signal from the external audio source device;
generating user preset information on a display area of the external audio source device by using a remote control function of the ear-set housing accommodating the ear-set case and storing the generated user preset information;
adjusting a size of the received audio signal based on the stored user preset information; and
outputting the adjusted audio signal.

13. The ear-set control method of claim 12, wherein at least one of an ear-set setting menu, audio listening menu and hearing test menu is executed by using the remote control function of the ear-set housing.

14. The ear-set control method of claim 13, wherein an audio listening level selected by a user from the audio listening menu is stored as the user preset information.

15. The ear-set control method of claim 13, wherein a result of a user hearing test performed by the user from the hearing test menu is stored as the user preset information.

* * * * *

UNITED STATES PATENT AND TRADEMARK OFFICE
CERTIFICATE OF CORRECTION

PATENT NO. : 10,542,357 B2  
APPLICATION NO. : 15/752722  
DATED : January 21, 2020  
INVENTOR(S) : Heungkyu Lee and Byounggi Lee Page 1 of 1

It is certified that error appears in the above-identified patent and that said Letters Patent is hereby corrected as shown below:

On the Title Page

(22) PCT Filed reads:
"Aug. 26, 2016"

Should read:
--Aug. 29, 2016--

Signed and Sealed this
Fifth Day of May, 2020

Andrei Iancu
*Director of the United States Patent and Trademark Office*